(12) United States Patent
Shiraishi et al.

(10) Patent No.: US 11,468,215 B2
(45) Date of Patent: Oct. 11, 2022

(54) DIGITAL TWIN FOR VEHICLE RISK EVALUATION

(71) Applicant: TOYOTA JIDOSHA KABUSHIKI KAISHA, Toyota (JP)

(72) Inventors: Shinichi Shiraishi, Tokyo (JP); Zhihao Jiang, Mountain View, CA (US); BaekGyu Kim, Mountain View, CA (US)

(*) Notice: Subject to any disclaimer, the term of this patent is extended or adjusted under 35 U.S.C. 154(b) by 475 days.

(21) Appl. No.: 16/007,693

(22) Filed: Jun. 13, 2018

(65) Prior Publication Data

US 2019/0384870 A1 Dec. 19, 2019

(51) Int. Cl.
*G06F 30/20* (2020.01)
*G06Q 40/08* (2012.01)

(52) U.S. Cl.
CPC .............. *G06F 30/20* (2020.01); *G06Q 40/08* (2013.01)

(58) Field of Classification Search
CPC .......... G06F 30/20; G06F 30/15; G06Q 40/08
See application file for complete search history.

(56) References Cited

U.S. PATENT DOCUMENTS

| 6,182,048 | B1 * | 1/2001 | Osborn | ................. | G06Q 40/08 |
| | | | | | 705/4 |
| 2002/0016653 | A1 * | 2/2002 | Levine | ................... | B60K 31/00 |
| | | | | | 701/1 |
| 2005/0137757 | A1 * | 6/2005 | Phelan | ..................... | G07C 5/02 |
| | | | | | 701/1 |

FOREIGN PATENT DOCUMENTS

JP PO2002-358425 12/2002

OTHER PUBLICATIONS

Boschert S., Rosen R. (2016) Digital Twin—The Simulation Aspect. In: Hehenberger P., Bradley D. (eds) Mechatronic Futures. Springer, Cham. https://doi.org/10.1007/978-3-319-32156-1_5 (Year: 2016).*
Weidner, W., Transchel, F. W., & Weidner, R. (2017). Telematic driving profile classification in car insurance pricing. Annals of actuarial science, 11(2), 213-236. (Year: 2017).*
Treiber, M., & Kesting, A. (Oct. 2014). Automatic and efficient driving strategies while approaching a traffic light. In 17th International IEEE Conference on Intelligent Transportation Systems (ITSC) (pp. 1122-1128). IEEE. (Year: 2014).*
Stephens, T. S., Gonder, J., Chen, Y., Lin, Z., Liu, C., & Gohlke, D. (2016). Estimated bounds and important factors for fuel use and consumer costs of connected and automated vehicles (No. NREL/TP-5400-67216). National Renewable Energy Lab.(NREL), Golden, CO (United States). (Year: 2016).*

* cited by examiner

*Primary Examiner* — Bijan Mapar
(74) *Attorney, Agent, or Firm* — Burbage Law, P.C.; Jon-Michael Burbage

(57) ABSTRACT

The disclosure includes embodiments for providing a vehicle risk evaluation and a modification for an onboard system of a vehicle to improve the operation of the onboard system. In some embodiments, a method includes generating a digital twin of a vehicle. The method includes receiving digital data recorded by a sensor and describing a condition of the vehicle as it exists in a real-world and a behavior of the vehicle as operated in the real-world. The method includes updating the digital twin of the vehicle based on the digital data so that the digital twin is consistent with the condition and the behavior.

20 Claims, 8 Drawing Sheets

DIGITAL TWIN FOR VEHICLE RISK EVALUATION

BACKGROUND

The specification relates to a digital twin for vehicle risk evaluation. In some embodiments, the specification relates to a sensor-based digital twin system operable to provide vehicle risk evaluation and a modification for an onboard system of a vehicle to improve the operation of the onboard system.

Insurance companies use vehicle profile data as a component of their insurance profile. The vehicle profile data is digital data that attempts to describe a condition of a vehicle and, for more advanced applications, how the vehicle is driven by its drivers. A driver is a human operator of a particular vehicle.

Insurance companies do not have access to the best available data for their vehicle profile datasets. For example, in reality the vehicle profile data that they have access to does not describe the real-time condition of the vehicle or real-time information about how the vehicle is driven by its drivers. As a result, insurance companies charge their customers more for insurance policies on their vehicles as a way of protecting themselves for the risk caused by not data that adequately describes the real-time condition of the vehicles or real-time information about how these vehicles are actually driven by their drivers.

Another problem is that vehicle owners desire to have their insurance rates reduced whenever possible, but there is no way to reduce the risks posed by their risky behavior so that their insurance rates are actually reduced.

SUMMARY

Described herein are embodiments of a digital twin system. In some embodiments, the digital twin system beneficially builds a digital twin of a real-world vehicle and then updates the status of the digital twin in real-time or near real-time based on the sensor data that is recorded by the real-world vehicle's onboard sensors. In this way, the digital twin describes: (1) the real-time condition or near real-time condition of the real-world vehicle; and (2) real-time information or near real-time information about how the real-world vehicle is driven by its drivers.

In some embodiments, the digital twin system knows the state of vehicles when they are new (i.e., their "new state") based on the vehicle models for each model of one or more real-world vehicles. For example, the digital twin system is operated by a vehicle manufacturer, and so, the digital twin system has access to the vehicle models for some or all of the real-world vehicles manufactured by the vehicle manufacturer. The real-world vehicle may be referred to below as a "vehicle" or a fleet of "vehicles."

In some embodiments, the digital twin system monitors a service life of a vehicle (or a fleet of vehicles) based on one or more of the following: (1) onboard data which is collected from the onboard sensors of the vehicle; and (2) measured data which is collected from sources that repair the vehicle such as dealerships, repair shops and used vehicle shops. In some embodiments, the onboard data and the measured data describe the depreciation/appreciation of the vehicle or specific components of the vehicle. In some embodiments, the onboard data also describes one or more of the following: (1) insurance metrics; and (2) behavioral metrics.

In some embodiments, the insurance metrics describe information that is relevant for determining a price for an insurance policy. Examples of insurance metrics include, among other things, one or more of the following: the driving area of the vehicle; the daily driving time of the vehicle; and the average daily driving distance of the vehicle. The insurance metrics are gathered by the onboard sensors of the vehicle and one or more Advanced Driving Assistance Systems ("ADAS system" if singular, "ADAS systems" if plural) of the vehicle.

As used herein, the term "insurance policy" refers to an insurance policy for a vehicle. For example, the term insurance policy refers to a liability insurance policy or a collision insurance policy for a particular driver to operate a particular vehicle (e.g., the vehicle 123 depicted in FIG. 1A and described in more detail below).

In some embodiments, the behavioral metrics include information that describe a behavior of a driver of the vehicle, with particular emphasis on behaviors that are relevant for determining a price for an insurance policy. Examples of the behavioral metrics include one or more of the following: (1) whether the driver engages in hard braking; (2) whether the driver engages in fast acceleration; (3) the driver's behavior at intersections (e.g., does the driver actually stop at intersections?, does the driver actually slow down for yellow lights?, how does the driver behave at four-way stop signs?, how does the driver handle merge situations?, etc.); and (4) the driver's dangerous interactions with other vehicles while driving the present vehicle.

In some embodiments, new instances of the onboard data and the measured data are repeatedly received by the digital twin system over a period of time. The state of each monitored vehicle is updated by the digital twin system based on instances of the onboard data and the measured data that are received over the period of time, thereby enabling the digital twin system to track the mechanical condition of the vehicle and whether particular components of the vehicles will need to be replaced in the near future based on their known state and known lifecycle [as indicated by the vehicle model for the vehicle]. In some embodiments, the digital twin system provides this service for a fleet of vehicles of various makes and models, and in this way, tracks the specific mechanical condition of specific vehicles within the fleet.

The output of updating the state of the vehicle is referred to as a "digital twin." The digital twin is a digitized version of the real-world vehicle which replicates the condition of: (1) the vehicle as a whole as indicated by the onboard data and the measured data; and (2) individual components of the vehicle as indicated by the onboard data and the measured data. The digital twin system models how the vehicle will perform in the future based on the current state of the vehicle as indicated by the digital twin for that vehicle.

In some embodiments, the digital twin, and its indication of the mechanical condition of a real-world vehicle, is referred to as a "vehicle profile." The vehicle profile is a dynamic vehicle profile because it is constantly updated based on the onboard updated based on the onboard data and the measured data as described above. In some embodiments, the digital twin system also builds a "behavior profile" for the driver based on their insurance metrics and behavior metrics. The behavior profile is digital data that describes the behavior of the driver, and their driving patters, when these behaviors and driving patterns are relevant to the pricing of their vehicle insurance policy. In some embodiments, the behavior profile is described by the behavior metrics that are included in the onboard data and the measured data. The vehicle profile and the behavior profile can be used to model (1) how the vehicle will perform and (2) how the driver will behave in the future based on the current state of the vehicle as indicated by the vehicle profile for that real-world vehicle and the driving/behavior patterns of the driver as described by the behavior profile. In some embodiments, the digital data that describes the behavior of the driver is an element of the modified vehicle model data which also describes the vehicle profile. In other words, both the vehicle profile and the behavior profile for a particular vehicle are incorporated in the digital twin for that vehicle, i.e., the modified vehicle model data which is depicted in FIG. 1A below.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method including: generating a digital twin of a vehicle, receiving digital data recorded by a sensor and describing a condition of the vehicle as it exists in a real-world and a behavior of the vehicle as operated in the real-world, and updating the digital twin of the vehicle based on the digital data so that the digital twin is consistent with the condition and the behavior. Other embodiments of this aspect include corresponding computer systems, apparatus, and computer programs recorded on one or more computer storage devices, each configured to perform the actions of the methods.

Implementations may include one or more of the following features. The method further including executing one or more simulations based on the digital twin, generating modification data based on the one or more simulations, and modifying an operation of the vehicle based on the modification data to reduce a risk created by the behavior. The method where modifying an operation of the vehicle based on the modification data includes modifying an operation of an onboard system of the vehicle so that a future behavior of the vehicle is less risky relative to the behavior. The method further including executing one or more simulations based on the digital twin, generating evaluation data based on the one or more simulations where the evaluation data describes a price of an insurance policy for the vehicle. The method where the evaluation data describes a risk created by the behavior of the vehicle as operated in the real-world. The method further including generating modification data that is operable to reduce the risk and modifying an operation of the vehicle based on the modification data. The method where the digital data describes real-time information about the condition of the vehicle in the real-world the behavior of the vehicle when operated in the real-world. The method where the sensor is an element of the vehicle. The method where the sensor is not an element of the vehicle. The method where the vehicle is an autonomous vehicle. The method where multiple instances of the digital data are received over time as part of a feedback loop and the digital twin is recursively updated based on the digital data received in the feedback loop. Implementations of the described techniques may include hardware, a method or process, or computer software on a computer-accessible medium.

One general aspect includes a system including: a non-transitory memory storing digital data recorded by a sensor and describing a condition of a vehicle as it exists in a real-world a behavior of the vehicle when operated in the real-world; and a processor that is communicatively coupled to the non-transitory memory, where the non-transitory memory stores computer code which, when executed by the processor, causes the processor to generate a digital twin of the vehicle, and update the digital twin of the vehicle based on the digital data so that the digital twin is consistent with the condition and the behavior. Other embodiments of this aspect include corresponding computer systems, apparatus, and computer programs recorded on one or more computer storage devices, each configured to perform the actions of the methods.

Implementations may include one or more of the following features. The system where the digital data describes a state of one or more vehicle components of the vehicle. The system where the computer code, when executed by the processor, further causes the processor to execute one or more simulations based on the digital twin, generate modification data based on the one or more simulations, and modify an operation of the vehicle based on the modification data to reduce a risk created by the behavior. The system where the computer code, when executed by the processor, further causes the processor to execute one or more simulations based on the digital twin, generate evaluation data based on the one or more simulations where the evaluation data describes a price of an insurance policy for the vehicle. The system where the evaluation data describes a risk created by the behavior of the vehicle as operated in the real-world. Implementations of the described techniques may include hardware, a method or process, or computer software on a computer-accessible medium.

One general aspect includes a computer program product including a non-transitory memory storing computer-executable code that, when executed by a processor, causes the processor to: generate a digital twin of a vehicle; receive digital data recorded by a sensor and describing a condition of the vehicle as it exists in a real-world and a behavior of the vehicle as operated in the real-world; and update the digital twin of the vehicle based on the digital data so that the digital twin is consistent with the condition and the behavior. Other embodiments of this aspect include corresponding computer systems, apparatus, and computer programs recorded on one or more computer storage devices, each configured to perform the actions of the methods.

Implementations may include one or more of the following features. The computer program product where the computer-executable code, when executed by the processor, further causes the processor to execute one or more simulations based on the digital twin, generate modification data based on the one or more simulations, and modify an operation of the vehicle based on the modification data to reduce a risk created by the behavior. The computer program product where the computer-executable code, when executed by the processor, further causes the processor to execute one or more simulations based on the digital twin, generate evaluation data based on the one or more simulations where the evaluation data describes a price of an insurance policy for the vehicle. The compute program product where the evaluation data describes a risk created by the behavior of the vehicle as operated in the real-world. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
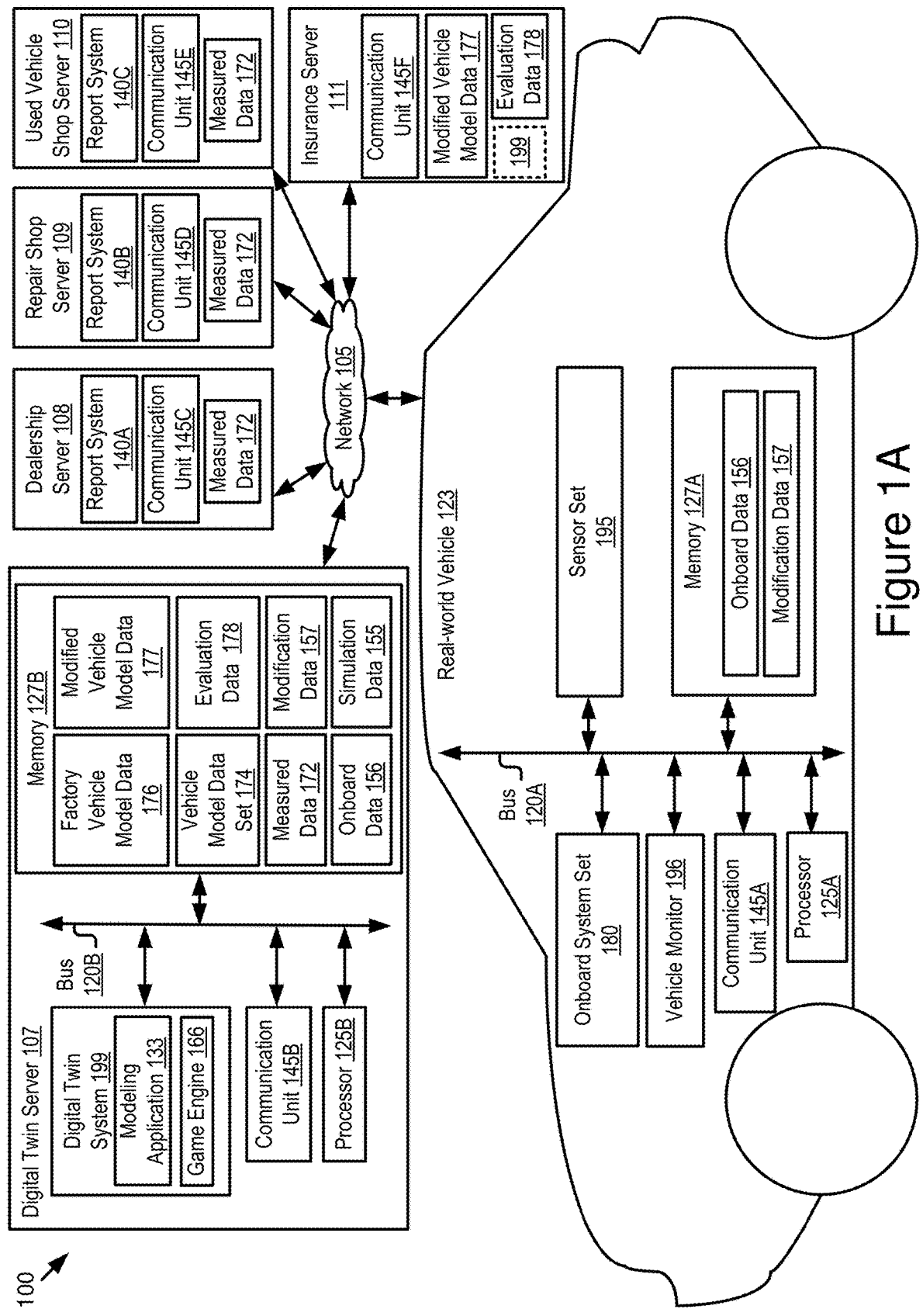
FIG. 1A is a block diagram illustrating an operating environment for a digital twin system according to some embodiments.

Described herein are embodiments of a digital twin system. In some embodiments, the digital twin system described herein determines the state of vehicles when they are new (i.e., their "new state") based on the design models for each model of vehicle that is monitored by the digital twin system. In some embodiments, the digital twin system monitors the vehicles of a single manufacturer of vehicles. The digital twin monitors the life of each vehicle based on (1) onboard data which is collected from the onboard sensors of each vehicle and (2) measured data which is collected from sources that repair each vehicle such as dealerships, repair shops and used car shops. The onboard data also describes information for behavioral metrics that are important for insurance pricing (see, e.g., the insurance metrics and the behavioral metrics described below). The state of each vehicle is constantly updated by the digital twin system based on the onboard data and the measured data, thereby enabling the digital twin system to track the mechanical condition of each vehicle. The output of constantly updating the state of the vehicle is referred to as a digital twin. In some embodiments, the digital twin is a digitized version of the real-world vehicle which replicates: the condition of the vehicle as a whole as indicated by the onboard data and the measured data; and individual components of the vehicle as indicated by the onboard data and the measured data. This digital twin, and its indication of the mechanical condition of a vehicle, is referred to as the "vehicle profile." The portion of the onboard data that describes the behavioral metrics is referred to as a "behavior profile." The vehicle profile and the behavior profile can be used by the digital twin system to model how the vehicle will perform and the driver will behave in the future based on the current state of the vehicle as indicated by the vehicle profile for that vehicle and the behavior patterns of the driver as behavior profile for the vehicle.

There are two existing general approaches to determining information about a vehicle and driver for insurance evaluation purposes: (1) static pricing; and (2) dynamic pricing. These existing solutions and their deficiencies are described in more detail below.

Static pricing is the most common approach to determining information about a vehicle and driver for insurance evaluation purposes, and also the least accurate. Insurance companies maintain a dataset that includes: static vehicle profile; and a static driver profile. A vehicle profile specifies: a vehicle type; and available safety features for the vehicle. A driver profile consists of data that describes: the driver's age; and the driver's accident record. Based on these static profiles, the insurance company determines pricing for a particular driver's insurance policy when they are driving a particular vehicle.

The existing solutions that include dynamic pricing utilize two types of datasets: a static vehicle profile; and a basic dynamic driver profile. The static vehicle profile is the same as that described above for "static pricing." Drivers who sign up for insurance products that include dynamic pricing are required to install an electronic dongle in their vehicle. The electronic dongle records data that describes information that consists of: (1) the vehicle's Vehicle Identification Number (VIN) number; (2) how many miles a driver drives each day; (3) how often a driver drives between midnight and 4:00 am each day; and (4) how frequently hard braking occurs. Existing solutions that include dynamic pricing records no other data than those listed in the preceding sentence. This data is used to construct a basic dynamic driver profile. The basic dynamic driver profile is very rudimentary and does not provide enough of the right data for analysis, much less the amount driver behavior data provided the monitor module described below with reference to the digital twin system. Also, the existing solutions that utilize dynamic pricing record no data whatsoever that could be used to create a dynamic vehicle model, much less a digital twin as is done by the digital twin system described herein.

Accordingly, the existing solutions that utilize dynamic pricing do not include a digital twin or any ability whatsoever to dynamically update the static vehicle model. By contrast, the digital twin system described herein includes a dynamic vehicle model that is based on a digital twin of a driver's real-world vehicle, including accounting for updates to the vehicle such as wear and tear and vehicle maintenance events. The digital twin system described herein also includes a richer data set for the driver's profile when compared to the existing solutions. The digital twin system described herein also provides modification data that is operable to modify the operation of one or more onboard systems of the vehicle so that: (1) the operation of the vehicle is less risky because the onboard systems [e.g., one or more ADAS systems of the vehicle] are modified to mitigate the risk posed by the driver's risky behavior; and (2) the driver's insurance is reduced because the risk posed by the driver's risky behavior is mitigated based on the modifications to the operation of the one or more onboard systems of the vehicle.

In some embodiments, the digital twin system described herein overcomes the deficiencies of the existing solutions by causing a processor to execute one or more of the following steps when executed by the processor: (1) generating a simulated version of the a vehicle in its "new state" based on vehicle model for that vehicle; (2) aggregating onboard data and measured data that describe changes in the state of the vehicle; (3) updating the vehicle model of the vehicle, i.e., the "digital twin," based on the onboard data and the measured data to form the modified vehicle model data; (4) executing one or more simulations using the modified vehicle model data and a set of simulation data (the one or more simulations model a future performance of the vehicle whose digital twin is described by the modified vehicle model data) to generate evaluation data; and (5) generating modification data based on the evaluation data. In some embodiments, the modification data is operable to reconfigure one or more onboard systems of the vehicle so that the risk posed by the driver of the vehicle is decreased. In some embodiments, the one or more simulations executed at step (4) estimate the risk posed by the driver of the vehicle and a fair price for an insurance policy for the driver of the vehicle. In some embodiments, the one or more simulations are executed on a periodic or continual basis, or when requested to do so by an end customer such as an insurance company. In some embodiments, the output of the one or more simulations is evaluation data that describes one or more of the following: a mechanical condition of the vehicle; whether particular parts of the vehicle will need to be replaced in the near future; how the vehicle will perform in the future; a risk posed by the driver of the vehicle; and a fair price for an insurance policy for the driver of the vehicle. In some embodiments, the modification data is generated by executing one or more simulations using the modified vehicle model data and the set of simulation data. In some embodiments, the one or more simulations that generate the modification data may include simulations executed at step (5) in addition to those that generate the evaluation data at step (4). In some embodiments, the modification data may be generated by the same simulations at step (4) that output the evaluation data.

In some embodiments, the process of generating the evaluation data is referred to as a vehicle risk evaluation.

In some embodiments, the onboard data and measured data may be received on a periodic or continual basis. In some embodiments, the onboard data and measured data generally describe depreciation in the state of the vehicle, but in practice the state may periodically increase, e.g., if a new component installed or when vehicle maintenance performed.

In some embodiments, the vehicle model is updated on a periodic or continual basis responsive to the receipt of instances of onboard data and measured data over time.

In some embodiments, the digital twin system has access to design data. The design data is digital data that describes the vehicle models, Computer-aided Design (CAD) data, simulation/test results for each model of vehicle. Based on the design data, the digital twin system determines the state of vehicles when they are new (i.e., their "new state"). The new state of the vehicle is represented in a simulation as a digital twin of the vehicle which exists in the real-word.

In some embodiments, a vehicle includes a vehicle monitor which is executed by an electronic control unit ("ECU") of the vehicle. The vehicle includes onboard systems and onboard sensors that monitor the condition of the vehicle and its components, and track for the occurrence of significant traffic events such as traffic accidents. For example, the onboard systems of the vehicle include one or more ADAS systems which monitor for and seek to avoid traffic accidents, and generate digital data describing when such events/accidents occur. Examples of ADAS systems are described below.

Onboard Data

In some embodiments, a communication unit of the vehicle receives onboard data via the in-vehicle network which communicatively couples the communication unit to the onboard systems and the onboard sensors of the vehicle. The onboard data is digital data that includes: (1) the sensor data that describes the measurements recorded by the vehicle's onboard sensors, system status indicators and user inputs; and (2) the ADAS data that describes the events/accidents detected by the vehicle's ADAS systems as well as vehicle dynamics information measured by the ADAS systems.

Considered individually or combined, the sensor data and ADAS data describe events that appreciate or depreciate the state of the vehicle (i.e., the condition of the vehicle). For example, if a component in the vehicle is replaced for a new or upgraded version, the state of the vehicle is appreciated because the component is new or upgraded. This is detected, for example, by the ECU which controls the component and detects a new device communicating with the in-vehicle network and the ECU may generate sensor data that describes this event. If the vehicle is involved in an accident, then this depreciates the state of the vehicle and the ADAS data describes the accident. In this way, the onboard data describes depreciation/appreciation information for a particular vehicle.

In some embodiments, the onboard data also describes one or more of the following: (1) insurance metrics; and (2) behavioral metrics.

In some embodiments, the insurance metrics describe information that is relevant for determining a price for an insurance policy. Examples of insurance metrics include, among other things, one or more of the following: the driving area of the vehicle; the daily driving time of the vehicle; and the average daily driving distance of the vehicle. The insurance metrics are gathered by the onboard sensors of the vehicle and one or more ADAS systems of the vehicle.

In some embodiments, the behavioral metrics include information that describe a behavior of a driver of the vehicle, with particular emphasis on behaviors that are relevant for determining a price for an insurance policy. Examples of the behavioral metrics include one or more of the following: (1) whether the driver engages in hard braking; (2) whether the driver engages in fast acceleration; (3) the driver's behavior at intersections (e.g., does the driver actually stop at intersections?, does the driver actually slow down for yellow lights?, how does the driver behave at four-way stop signs?, how does the driver handle merge situations?, etc.); and (4) the driver's dangerous interactions with other vehicles while driving the present vehicle.

Vehicle Monitor

In some embodiments, the vehicle monitor is software executed by an ECU of the vehicle. The vehicle monitor communicates with the communication unit of the vehicle to aggregate and timestamp the onboard data. The vehicle monitor then reports the onboard data back to the digital twin system which is stored on and executed by a server that is communicatively coupled to a wireless network. For example, the vehicle monitor causes the communication unit of the vehicle to transmit aggregated and timestamped sets of the onboard data back to the digital twin system (which operates on a cloud server) at regular intervals via Wi-Fi™, 3G, 4G, Long-term Evolution (LTE), 5G, Direct Short-Range Communication (DSRC) or some other form of wireless communication. In another embodiment, the onboard data is reported back to the digital twin system when the vehicle goes to a dealership for servicing (e.g., at each oil change).

Accordingly, the onboard data is a first source of digital data for the digital twin system that describes the appreciation and depreciation of the of the vehicle.

In some embodiments, the vehicle is taken to a dealership, repair shop or used vehicle shop from time to time for servicing. In many instances, these service events are detected by the onboard systems of the vehicle and described by the onboard data. However, an optional feature according to some embodiments is the ability to capture these service events via electronic reports that are sent are sent by a report system which is provided to the dealerships, repair shops and used vehicle shops.

For example, these dealerships, repair shops and used vehicle shops include servers that are communicatively coupled to a network. Measured data is digital data that describes the service events that occur at these dealerships, repair shops and used vehicle shops. The servers include a report system. The report system is software installed in the servers of these dealerships, repair shops and used vehicle shops. The report system reports the measured data back to the digital twin system so that the measured data can be included in the analysis and functionality provided by the digital twin system.

Accordingly, the measured data is a second source of digital data for the digital twin system that describes the appreciation and depreciation of the vehicle, where the onboard data is the first source of such digital data.

The report system and the measured data are optional features of some embodiments described herein.

Digital Twin System

In some embodiments, the digital twin system includes software stored on a non-transitory memory. The non-transitory memory is an element of a processor-based computing device such as a server or cloud server. The digital twin system includes code and routines that are operable, when executed by a processor of the computing device, to cause the processor to (1) receive digital data that describes depreciation and appreciation events for a vehicle that includes a vehicle monitor and (2) generate a simulated version of the vehicle it monitors. The simulation version of the vehicle is referred to herein as a "digital twin." The digital twin system is operable to cause the processor to execute additional steps as described below. See, e.g., FIGS. 1B, 1C, 3 and descriptions of the evaluation data and the modification data provided herein.

In some embodiments, the digital twin system includes a game engine for generating the simulated version of the vehicle. For example, the digital twin system uses the vehicle model for a particular vehicle (based on the vehicle's particular make and model, e.g., 2019 Toyota Camry) to generate a simulated version of the particular vehicle.

In some embodiments, the digital twin system maintains a unique instance of a digital model for each particular vehicle it monitors. This unique instance is described as a "vehicle model" since it is a version of the digital model that is used to generate a simulation of a particular vehicle. In some embodiments, the digital twin system includes a simulation data set that includes the vehicle models for each of the vehicles monitored by the digital twin system.

The vehicle model includes any digital data and information that is necessary for the game engine to generate a digital twin of a real-world vehicle. In some embodiments, the vehicle model is based on design data for the real-world vehicle whose digital twin is created using the vehicle model. In some embodiments, the digital twin system includes a modeling application that is operable to generate the vehicle model for a particular vehicle based in part on the design data and, optionally, any onboard data and measured data that are received for a vehicle that is being monitored by the digital twin system.

Initially, the vehicle model is referred to as "factory vehicle model" since it represents the version of the vehicle as it was manufactured, i.e., without any depreciation or appreciation. Over the life of a particular vehicle, the digital twin system receives reports of onboard data and measured data for this particular vehicle. The digital twin system modifies particular parameters of the vehicle model for this particular vehicle based on the depreciation/appreciation information included in the onboard data and the measured data.

For example, if the onboard data indicates that the vehicle now has 100,000 miles on the odometer, then the digital twin system modifies the vehicle model to reflect this depreciation for the engine, radiator, transmission, etc. for the vehicle. A vehicle model which reflects the depreciation and appreciation for a vehicle which occurs over time is referred to as the "modified vehicle model." No other vehicle model uses onboard data and measured data to generate a digital twin of a real-world vehicle which accurately reflects the mechanical condition of a used vehicle and whether particular parts of the vehicle will need to be replaced in the near future.

In some embodiments, the digital twin system modifies particular parameters of the vehicle model for a particular vehicle based on one or more of the following (1) the depreciation/appreciation information included in the onboard data and the measured data; (2) the insurance metrics included in the onboard data; and (3) the behavioral metrics included in the onboard data. For example, if the onboard data indicates that the vehicle now is routinely driven twenty-five (25) miles per work five days per week for a work commute at times when the driving environment is dark (e.g., early morning) or the roads are congested with other vehicles (e.g., 5:00 PM rush hour), then the digital twin system modifies the vehicle model to reflect: this depreciation for the engine, radiator, transmission, etc. for the vehicle (i.e., an example of depreciation information according to some embodiments); this routine behavior by the driver (i.e., an example of a behavior metric according to some embodiments); and the increased risk posed by this routine behavior by the driver (i.e., an example of an insurance metric according to some embodiments). The modified vehicle model is novel, for example, because no other vehicle model used for generating digital simulations uses onboard data and measured data to generate a digital twin of a real-world vehicle which accurately reflects the mechanical condition of the real-world vehicle and insurance metrics and behavioral metrics for that real-world vehicle.

In some embodiments, the modeling application includes any Modelica-based modeling application. The modeling application may include CarSim (distributed by Mechanical Simulation Corporation or Ann Arbor, Mich.), MapleSim (distributed by Maplesoft of Waterloo, Ontario) or any other Modelica-based modeling application.

In some embodiments, the game engine is a Unity-based game engine (such as the Unity game engine distributed by Unity Technology of San Francisco, Calif.), or any other game engine which is operable, when executed by a processor, to generate a digital simulation (herein "simulation") for testing and monitoring the operation of a virtual vehicle that represents a real-world vehicle that exists in the real-world.

The modeling application includes code and routines that are operable, when executed by a processor, to generate vehicle model data that describes a vehicle model of a vehicle. The vehicle model data includes any digital data that is necessary to cause the game engine to generate a virtualized version of the real-world vehicle.

In some embodiments, the factory vehicle model is described by digital data referred to as the "factory vehicle model data" and the modified vehicle model is described by digital data described as the "modified vehicle model data." See, e.g., FIG. 1A. The factory vehicle model and the modified vehicle model may be referred to herein collectively or individually as the "vehicle model."

Evaluation Data

In some embodiments, the digital twin system includes code and routines that are operable, when executed by a processor, to receive the modified vehicle model data as an input and then cause the processor to perform hundreds or thousands of simulations to generate evaluation data that is digital data that describes one or more estimates for one or more of the following: (1) whether particular parts of the real-world version of the vehicle will need to be replaced in the near future; (2) how the real-world version of the vehicle will perform in the future; (3) a risk posed by the driver of the vehicle; and (4) a fair price for an insurance policy for the driver of the vehicle.

Modification Data

In some embodiments, the digital twin system includes code and routines that are operable, when executed by a processor, to receive the modified vehicle model data as an input and then cause the processor to perform hundreds or thousands of simulations to generate modification data that is digital data that describes one or more modifications for the operation of one or more onboard systems (e.g., an ADAS system) of the vehicle that will reduce the risk posed by the driver of the vehicle and lower the fair price for the insurance policy (see, e.g., item (4) for the evaluation data described in the preceding paragraph).

ADAS System

Examples of an ADAS system may include one or more of the following elements of an real-world vehicle: an adaptive cruise control (ACC) system; a lane keeping assistant system (LKA); an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system.

The ADAS system may also include any software or hardware included in a real-world vehicle that makes that vehicle be an autonomous vehicle or a semi-autonomous vehicle.

In some embodiments, the ADAS system may be a vehicular system that is operable to perform or control the performance of one or more of the following vehicle functions: the steering of the vehicle; the braking of the vehicle; the acceleration of the vehicle; the operation of a transmission of the vehicle; and how aggressive or passive (e.g., fast or slow, respectively) the transmission changes one or more gears of the transmission. In this way, the ADAS system modifies the operation of an autonomous or semi-autonomous vehicle.

In some embodiments, the ADAS system may be a vehicular system that is operable to perform or control the performance of one or more of the following vehicle functions: how easily a steering wheel of the vehicle is turned by a driver of the vehicle; how much resistance the steering wheel provides to the driver when the driver attempts to turn the steering wheel; how readily a braking system of the vehicle decelerates or stops the vehicle when the driver depresses a braking pedal of the vehicle; how readily the engine of the vehicle accelerates when the driver of the vehicle depresses an accelerator of the vehicle; how aggressive or passive (e.g., fast or slow, respectively) the transmission changes one or more gears of the transmission when the driver of the vehicle provides an input that is operable to affect how or when the transmission changes the one or more gears of the transmission; and how sluggish an engine of the vehicle performs when the driver provides an input that is operable to affect the operation of the engine. In this way, an ADAS system of the vehicle is operable to affect the performance or operation of one or more vehicle components (or their apparent performance as viewed from the perspective of the driver of the vehicle), including, for example: a power steering pump of the vehicle; a braking system of the vehicle; a fuel line of the vehicle; a fuel injector of the vehicle; a transmission of the vehicle; and an engine of the vehicle.

System Overview

Referring to FIG. 1A, depicted is an operating environment 100 for a digital twin system 199 according to some embodiments. The operating environment 100 as depicted includes a real-world vehicle 123 (herein "vehicle 123" if singular, or "vehicles 123" if plural), a digital twin server 107, a dealership server 108, a repair shop server 109, a used vehicle shop server 110 and an insurance server 111. These elements may be communicatively coupled to one another via a network 105. Although one vehicle 123, one digital twin server 107, one dealership server 108, one repair shop server 109, one used vehicle shop server 110, one insurance server 111 and one network 105 are depicted in FIG. 1A, in practice the operating environment 100 may include one or more vehicles 123, one or more digital twin servers 107, one or more dealership servers 108, one or more repair shop servers 109, one or more used vehicle shop servers 110, one or more insurance servers 111, or one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, etc. The network 105 may also include a mobile data network that may include 3G, 4G, LTE, LTE-V2X, VoLTE or any other mobile data network or combination of mobile data networks. Further, the network 105 may include one or more IEEE 802.11 wireless networks.

The network 105 may include one or more communication channels shared among the vehicle 123 and the digital twin server 107. The communication channel may include DSRC, LTE-V2X, full-duplex wireless communication or any other wireless communication protocol. For example, the network 105 may be used to transmit a DSRC message, a DSRC probe, a Basic Safety Message (BSM) or a full-duplex message including any of the data described herein.

The vehicle 123 is any type of connected vehicle. For example, the vehicle 123 is one of the following types of vehicles: a car; a truck; a sports utility vehicle; a bus; a semi-truck; a drone or any other roadway-based conveyance.

In some embodiments, the vehicle 123 is an autonomous vehicle or a semi-autonomous vehicle. For example, the vehicle 123 includes an onboard system set 180. The onboard system set 180 includes a set of ADAS systems. The set of ADAS systems provide sufficient autonomous features to the vehicle 123 to render the vehicle 123 an autonomous vehicle. The National Highway Traffic Safety Administration (NHTSA) has defined different "levels" of autonomous vehicles, e.g., Level 0, Level 1, Level 2, Level 3, Level 4, and Level 5. If a vehicle 123 has a higher-level number than another vehicle 123 (e.g., Level 3 is a higher-level number than Levels 2 or 1), then the vehicle 123 with a higher-level number offers a greater combination and quantity of autonomous features relative to the vehicle 123 with the lower level number. The different levels of autonomous vehicles are described briefly below.

Level 0: The set of ADAS systems installed in the vehicle 123 have no vehicle control but may issue warnings to the driver of the vehicle 123.

Level 1: The driver must be ready to take control of the vehicle 123 at any time. The set of ADAS systems installed in the vehicle 123 may provide autonomous features such as one or more of the following: an ACC; and Parking Assistance with automated steering and LKA Type II, in any combination.

Level 2: The driver is obliged to detect objects and events in the roadway environment and respond if the set of ADAS systems installed in the vehicle 123 fail to respond properly (based on the driver's subjective judgement). The set of ADAS systems installed in the vehicle 123 executes accelerating, braking, and steering. The set of ADAS systems installed in the vehicle 123 can deactivate immediately upon takeover by the driver.

Level 3: Within known, limited environments (such as freeways), the driver can safely turn their attention away from driving tasks but must still be prepared to take control of the vehicle 123 when needed.

Level 4: The set of ADAS systems installed in the vehicle 123 can control the vehicle 123 in all but a few environments such as severe weather. The driver must enable the automated system (which is comprised of the set of ADAS systems installed in the vehicle 123) only when it is safe to do so. When the automated system is enabled, driver attention is not required for the vehicle 123 to operate safely and consistent with accepted norms.

Level 5: Other than setting the destination and starting the system, no human intervention is required. The automated system can drive to any location where it is legal to drive and make its own decision (which may vary based on the jurisdiction where the vehicle 123 is located).

In some embodiments, the vehicle 123 is a Highly Autonomous Vehicle ("HAV" if singular, or "HAVs" if plural). An HAV is a vehicle 123 (e.g., the DSRC-enabled ego vehicle) that includes a set of ADAS systems that operate at Level 3 or higher as described and above, or as defined by the NHTSA on page 9 of their policy paper entitled "Federal Automated Vehicles Policy: Accelerating the Next Revolution in Roadway Safety," which was published in September of 2016.

In some embodiments, the vehicle 123 includes one or more of the following elements: a processor 125A; a memory 127A; a communication unit 145A; an onboard system set 180; a sensor set 195; and a vehicle monitor 196. These elements of the vehicle 123 are communicatively coupled to one another via a bus 120A. Although only one of each of these elements are depicted in FIG. 1A, in practice the vehicle 123 may include one or more processors 125A, one or more memories 127A, one or more communication units 145A, one or more onboard system sets 180, one or more sensor sets 195 and one or more vehicle monitors 196.

The digital twin server 107 is a processor-based computing device. For example, the digital twin server 107 may include one or more of the following types of processor-based computing devices: a personal computer; a laptop; a mainframe; or any other processor-based computing device that is operable to function as a server. The digital twin server 107 may include a hardware server.

In some embodiments, the digital twin server 107 includes one or more of the following elements: a processor 125B; a memory 127B; a communication unit 145B; and a digital twin system 199. These elements of the digital twin server 107 are communicatively coupled to one another via a bus 120B.

The processor 125A of the vehicle 123 and the processor 125B of the digital twin server 107 may be referred to herein collectively or individually as the "processor 125" since, for example, the processor 125A of the vehicle 123 provides similar functionality to the components of the vehicle 123 as does the processor 125B of the digital twin server 107. For similar reasons, the description provided herein uses the following terms when referring to elements that are common to one or more of the vehicle 123, the digital twin server 107, the dealership server 108, the repair shop server 109, the used vehicle shop server 110, and the insurance server 111: the "memory 127" when referring to the memory 127A and the memory 127B, collectively or individually; and the "communication unit 145" when referring to the communication unit 145A, the communication unit 145B, the communication unit 145C, the communication unit 145D, the communication unit 145E, and the communication unit 145F, collectively or individually.

The vehicle 123 and the digital twin server 107 are now separately described.

Vehicle 123

In some embodiments, the processor 125 and the memory 127 may be elements of an onboard vehicle computer system of the vehicle 123. The onboard vehicle computer system may be operable to cause or control the operation of one or more of the following elements: one or more ADAS systems included in the onboard system set 180; the sensor set 195; the communication unit 145; the processor 125; and the memory 127; and the vehicle monitor 196. The onboard vehicle computer system may be operable to access and execute the data stored on the memory 127 to provide the functionality described herein for the vehicle monitor 196. The onboard vehicle computer system may be operable execute the vehicle monitor 196 which causes the onboard vehicle computer system to execute one or more of the steps of the method 300 described below with reference to FIG. 3.

The onboard system set 180 includes one or more ADAS systems. The ADAS systems provide one or more autonomous features to the vehicle 123. In some embodiments, the vehicle 123 is an autonomous vehicle, a semi-autonomous vehicle, or an HAV. For example, the vehicle 123 includes a set of ADAS systems that provide autonomous features to the vehicle 123, which are sufficient to render the vehicle 123 an autonomous vehicle.

The ADAS systems may include one or more of the following elements: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system (also referred to as a lane keep assistant); a pedestrian protection system; a traffic sign recognition system; a turning assistant; a wrong-way driving warning system; autopilot; sign recognition; and sign assist. Each of these example ADAS systems provide their own features and functionality that may be referred to herein as an "ADAS feature" or "ADAS functionality," respectively. The features and functionality provided by these example ADAS systems are also referred to herein as an "autonomous feature" or an "autonomous functionality," respectively.

In some embodiments, the modification data 157 described herein is operable to modify the operation of an ADAS system of the vehicle 123 so that an autonomous feature provided by the ADAS system is modified in a way that is operable to lower a cost of the insurance policy for the vehicle 123. For example, the modification data 157 modifies the operation of the ADAS system so that the autonomous feature causes the operation of the vehicle 123 to be less risky relative to the operation of the vehicle 123 prior to modifying the operation of the ADAS system based on the modification data 157. The modification data 157 is described in more detail below.

The sensor set 195 includes any onboard sensors of the vehicle 123 which monitor the roadway environment of the vehicle 123, whether internally or externally. In some embodiments, the sensor set 195 may include any sensors in the vehicle 123 that generate sensor data during a journey. In some embodiments, the sensor set 195 of the vehicle 123 may include one or more of the following vehicle sensors: a vibrometer; a collision detection system; an engine oil pressure detection sensor; a camera (e.g., one or more of an internal camera and an external camera); a LIDAR sensor; an ultrasonic sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor. The vehicle monitor 196 incorporates the sensor data generated by these onboard sensors into the onboard data 156 stored in the memory 127.

The communication unit 145 transmits and receives data to and from a network 105 or to another communication channel. In some embodiments, the communication unit 145 may include a DSRC transceiver, a DSRC receiver and other hardware or software necessary to make the vehicle 123 (or some other device such as the digital twin server 107) a DSRC-enabled device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The vehicle 123 may include one or more processors 125. Other processors, operating systems, sensors, displays, and physical configurations may be possible.

The memory 127 stores instructions or data that may be accessed and executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random-access memory (virtual RAM). The vehicle 123 may include one or more memories 127.

The memory 127 of the vehicle 123 stores one or more of the following: the onboard data 156; and the modification data 157.

In some embodiments, the onboard data 156 includes digital data that that includes: (1) sensor data that is digital data that describes the measurements recorded by the vehicle's onboard sensors which are included in the sensor set 195, system status indicators and user inputs; and (2) ADAS data that is digital data that describes the events/accidents detected by the vehicle's ADAS systems as well as vehicle dynamics information measured by the ADAS systems. In some embodiments, the onboard system set 180 includes one or more ADAS systems.

In some embodiments, the onboard data 156 includes digital data that describes one or more of the following: (1) the sensor data; (2) the ADAS data; (3) insurance metrics; and (4) behavioral metrics. The sensor data and the ADAS data are described in more detail in the preceding paragraph.

In some embodiments, the insurance metrics are digital data that describe information that is relevant for determining a price for an insurance policy. Examples of an insurance metric include, among other things, one or more of the following: a driving area of the vehicle 123; a daily driving time of the vehicle 123; and an average daily driving distance of the vehicle 123. The insurance metrics are gathered by the sensor set 195 of the vehicle 123 and one or more ADAS systems of the vehicle 123.

The insurance metrics are now described in more detail according to some embodiments. In some embodiments, the driving area of the vehicle 123 describes a bounded area on an electronic map that the vehicle 123 generally stays within while being operated. The daily driving time describes, for example: (1) a first time when the vehicle 123 generally begins a daily morning commute (e.g., 6:00 AM) to work from home; and (2) a second time when the vehicle 123 generally begins a daily evening commute (e.g., 5:30 PM) to home from work. The average daily driving distance describes the mileage that the vehicle 123 travels during a day on an average.

In some embodiments, the behavioral metrics are digital data that describe a behavior of a driver of the vehicle, with particular emphasis on behaviors that are relevant for determining a price for an insurance policy for the vehicle 123. Examples of a behavioral metric includes, among other things, one or more of the following: (1) whether the driver of the vehicle 123 engages in hard braking; (2) whether the driver engages in fast acceleration [sometimes referred to as "hard accelerating" or "hard acceleration"]; (3) the driver's behavior at intersections; and (4) the driver's dangerous interactions with other vehicles while driving the vehicle 123.

The behavior metrics are now described in more detail according to some embodiments. Hard braking and hard acceleration is a driver event when more force than normal is applied to the brake pedal or the accelerator pedal of the vehicle 123 respectively. Either type of behavior is correlated with increased risk of accidents and unsafe driving. The behavior metrics that describes the driver's behavior at intersections describes one or more of the following: whether the driver actually stop at intersections (versus, e.g., a rolling stop); whether the driver actually slows down for illuminated yellow lights (e.g., the illuminated yellow light of a traffic signal or a flashing yellow light of a street sign or cross walk signal); how the driver behaves at four-way stop signs; and how the driver handles merge situations. The behavior metrics that describes the dangerous interactions with other vehicles describes, for example, near-miss accidents with other vehicles, whether other vehicles had to swerve to avoid a collision with the vehicle 123, whether other vehicles had to hard brake or hard accelerate to avoid a collision with the vehicle 123, how closely the driver of the vehicle 123 follows behind other vehicles, whether the driver passes other vehicles on a double yellow line, and other dangerous interactions with other vehicles.

The modification data 157 is digital data that describes modifications for one or more onboard systems of the vehicle 123 such as those included on the onboard system set 180. In some embodiments, the modification data 157 is digital data that is operable to modify the operation of one or more onboard systems of the vehicle so that: (1) the operation of the vehicle 123 is less risky because the onboard systems [e.g., one or more ADAS systems of the vehicle 123] are modified to mitigate the risk posed by the driver's risky behavior [e.g., as described by one or more of a behavior metric and an insurance metric]; and (2) the driver's insurance policy for the vehicle 123 is reduced because the risk posed by the driver's risky behavior is mitigated based on the modifications to the operation of the one or more onboard systems of the vehicle 123.

For example, if the behavior metrics indicate that the driver engages in hard braking, then in some embodiments the modification data 157 describes a modification for an ADAS system of the vehicle 123 which provides a notification to the driver that they are engaging in hard braking or, if the sensor data generated by the sensor set 195 indicates that it is safe to do so, modifies how the brakes of the vehicle 123 respond to the hard braking behavior of the driver (e.g., overriding the hard braking behavior so that, even though the driver is pressing the brake pedal in a manner consistent with hard braking, the brakes of the vehicle 123 respond with a more moderate braking action relative to how the brakes would ordinarily respond to the driver's hard braking activity). A notification includes, for example, one or more of the following: a visual notification via an electronic display of the vehicle 123 (e.g., a head unit display); an auditory notification via a speaker of the vehicle 123; and an audio/visual notification.

In another example, if the behavior metrics indicate that the driver engages in hard acceleration, then in some embodiments the modification data 157 describes a modification for an ADAS system of the vehicle 123 which provides a notification to the driver that they are engaging in hard acceleration or, if the sensor data generated by the sensor set 195 indicates that it is safe to do so, modifies how the engine or motor of the vehicle 123 responds to the hard acceleration behavior of the driver (e.g., overriding the hard acceleration behavior so that, even though the driver is pressing the acceleration pedal in a manner that is consistent with hard acceleration, the engine or motor of the vehicle 123 responds with a more moderate acceleration action relative to how the engine or motor would ordinarily respond to the driver's hard acceleration activity).

In a third example, if the behavior metrics indicate that the driver does not stop at intersections, then in some embodiments the modification data 157 describes a modification for an ADAS system of the vehicle 123 which provides a notification to the driver that they are not stopping at an intersection (or failed to stop at an intersection) or, if the sensor data generated by the sensor set 195 indicates that it is safe to do so, detects a presence of an intersection using one or more sensors of the sensor set 195 and engages the brakes of the vehicle 123 as the vehicle 123 arrives at the intersection so that the vehicle 123 actually stops at the intersection. In some embodiments, the ADAS system as modified by the modification data 157 allows the driver to resume control of the operation of the vehicle 123 following the complete stop of the vehicle 123 at the intersection.

In a fourth example, if the behavior metrics indicate that the driver does not slow down for illuminated or flashing yellow lights, then in some embodiments the modification data 157 describes a modification for an ADAS system of the vehicle 123 which provides a notification to the driver that they are not slowing down for illuminated yellow lights or flashing yellow lights (e.g., those provided by traffic signals, street signs or cross walks) or, if the sensor data generated by the sensor set 195 indicates that it is safe to do so, detects a presence of an illuminated or flashing yellow light using one or more sensors of the sensor set 195 and engages the brakes of the vehicle 123 as the vehicle 123 approaches the illuminated or flashing yellow light to ensure that the vehicle 123 actually slows down responsive to the presence of the illuminated or flashing yellow light. In this way, the modification data 157 beneficially prevents the vehicle 123 from creating a risky situation by not slowing down for an illuminated or flashing yellow light. In some embodiments, the ADAS system as modified by the modification data 157 allows the driver to resume control of the operation of the vehicle 123 following the deceleration of the vehicle 123 responsive to the illuminated or flashing yellow light.

The above examples of how the modification data 157 modifies the operation of an ADAS system are intended to be illustrative and not limiting. Other examples are possible.

The vehicle monitor 196 includes code or routines that, when executed by the processor 125, causes the onboard data 156 to be recorded and causes the communication unit 145 to transmit the onboard data 156 to the digital twin system 199 of the digital twin server 107 via the network 105.

In some embodiments, the communication unit 145 of the vehicle 123 receives onboard data 156 via an in-vehicle network which communicatively couples the communication unit 145 to the onboard sensors and systems of the vehicle 123. The vehicle monitor 196 includes code and routines that are operable, when executed by the processor 125 of the vehicle 123, to cause the processor 125 to execute one or more of the following steps: (1) communicate with the communication unit 145 of the vehicle 123 to receive the onboard data 156; (2) aggregate and timestamp the onboard data 156; and (3) report the onboard data 156 to the digital twin system 199 via the network 105.

In some embodiments, the vehicle monitor 196 reports the onboard data 156 to the digital twin system 199 by executing one or more of the following steps: building a wireless message that includes the onboard data 156 as a payload of the wireless message; and wirelessly transmitting the wireless message to the digital twin server 107 via the network 105.

In some embodiments, the vehicle monitor 196 includes code and routines that are operable, when executed by the processor 125 of the vehicle 123, to cause the processor 125 to execute one or more of the following steps: collect the onboard data 156; store the onboard data 156 in the memory 127; build the wireless message that includes the onboard data 156 as the payload for the wireless message; and cause the communication unit 145 of the vehicle 123 transmit the onboard data 156 to the digital twin server 107 via the network 105.

In some embodiments, the vehicle monitor 196 of the vehicle 123 may be implemented using hardware including a field-programmable gate array ("FPGA") or an application-specific integrated circuit ("ASIC"). In some other embodiments, the vehicle monitor 196 may be implemented using a combination of hardware and software.

The vehicle monitor 196 is described in more detail below with reference to FIGS. 1B, 1C, 2 and 3.

Digital Twin Server 107

In some embodiments, the digital twin server 107 is a cloud server that includes one or more of the following elements: a digital twin system 199; a processor 125; a memory 127; and a communication unit 145. These elements are communicatively coupled to one another via the bus 120B. The following elements of the digital twin server 107 are the same or similar to those described above for the vehicle 123, and so, the descriptions of these elements will not be repeated here: the processor 125; the memory 127; and the communication unit 145.

Figure 1B:
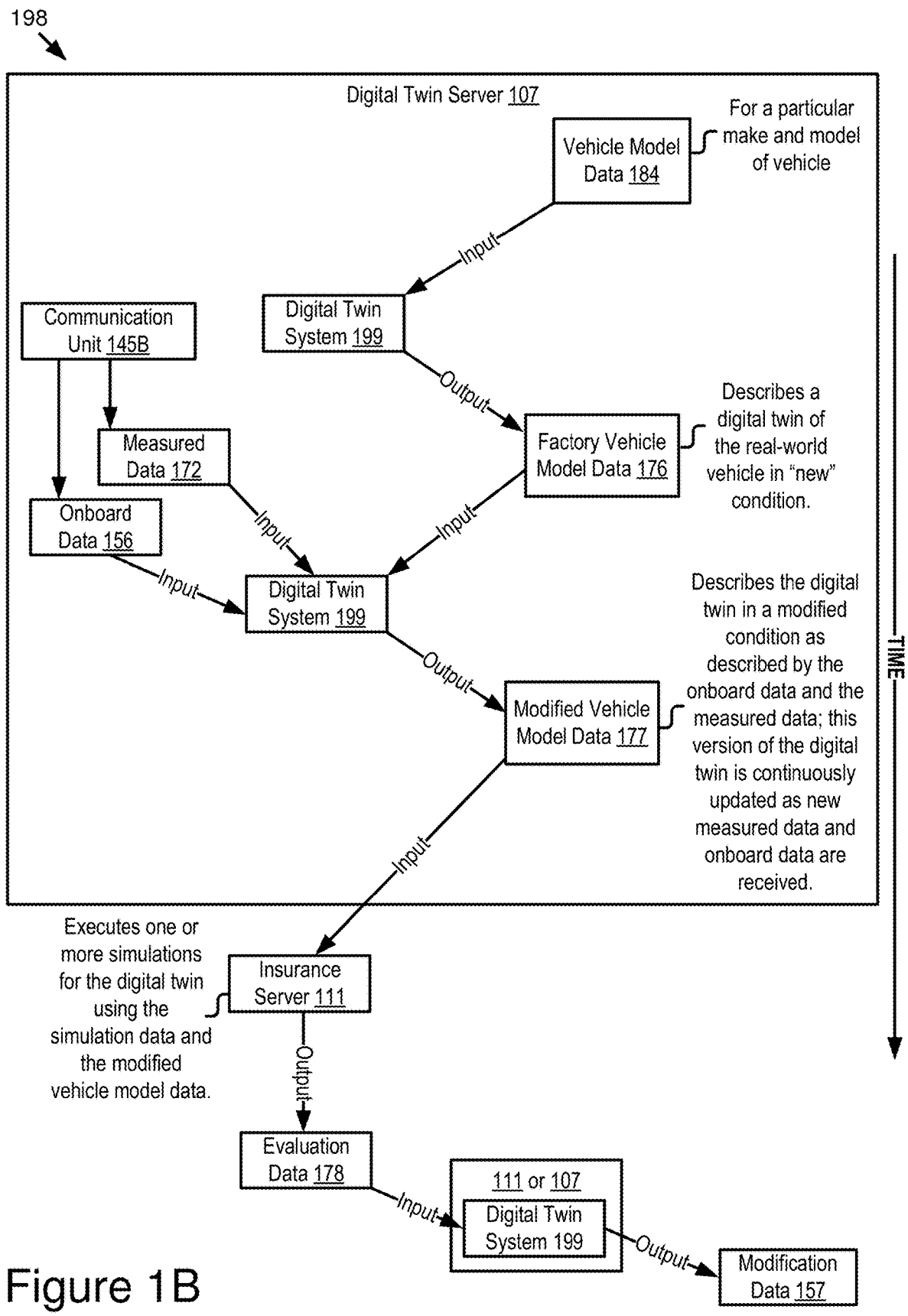
FIG. 1B is a block diagram illustrating a process flow for a digital twin system to provide evaluation data and modification data according to some embodiments.
Figure 1C:
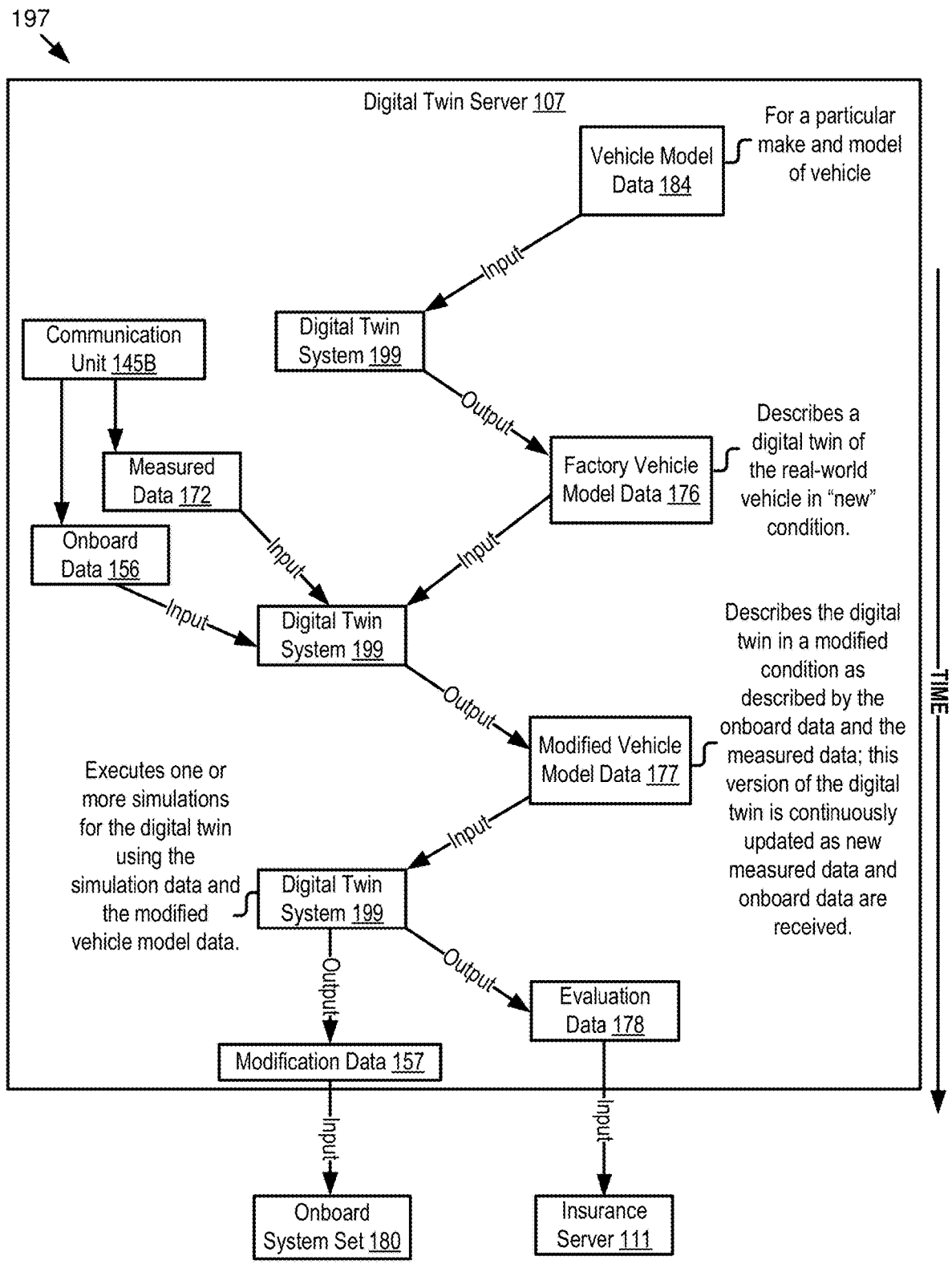
FIG. 1C is a block diagram illustrating a process flow for a digital twin system to provide evaluation data and modification data according to some embodiments.

The memory 127 of the digital twin server 107 stores one or more of the following elements: vehicle model data set 174; factory vehicle model data 176; measured data 172; onboard data 156; modified vehicle model data 177; evaluation data 178; simulation data 155; and the modification data 157. Although not depicted in FIG. 1A, the memory 127 of the digital twin server 107 also stores vehicle model data 184 in some embodiments. Example embodiments that include the vehicle model data 184 are also depicted in FIGS. 1B and 1C.

The vehicle model data set 174 includes digital data that describes one or more vehicle models for one or more real-world vehicles such as the vehicle 123. For example, the vehicle model data set 174 includes a set of instances of vehicle model data 184 (see, e.g., FIGS. 1B and 1C) that describe a set of different vehicle models. In some embodiments, the vehicle model data set 174 includes an instance of the vehicle model data 184 for each make and model of vehicle offered by a particular vehicle manufacturer (e.g., Toyota). In this way the vehicle model data set 174 includes a plurality of different vehicle models for different vehicles such as the vehicle 123.

In some embodiments, the vehicle model data 184 includes digital data that describes design information for the vehicle 123 and its individual vehicle components. For example, the design information includes Computer-Aided Design (CAD) data from an Original Equipment Manufacturer (OEM) of the vehicle 123 or its individual vehicle components. In this way, an instance of vehicle model data 184 describes a "factory vehicle model" for a particular vehicle such as the vehicle 123 since the factory vehicle model described by the vehicle model data 184 represents the version of the vehicle (e.g., the vehicle 123) as it was manufactured, i.e., without any depreciation or appreciation.

In some embodiments, the vehicle model data set 174 is indexed based on make and model so that the digital data that describes particular factory vehicle models are retrievable from the vehicle model data set 174 by querying the vehicle model data set 174 by specifying a particular a make and model of a particular vehicle 123. For example, the digital twin system 199 initiates monitoring of a particular real-world vehicle such as the vehicle 123 (e.g., when the vehicle is sold by a dealer or its manufacture is completed). The digital twin system 199 receives digital data describing the make and model of the vehicle 123. In some embodiments, the make and model of a particular vehicle 123 are identifiable based on the vehicle identification number (VIN) for the particular vehicle 123. The digital twin system 199 queries the vehicle model data set 174 using the make and model information of the vehicle 123 to identify, from the vehicle model data set 174, the particular vehicle model data 184 for this particular vehicle 123.

In some embodiments, the digital twin system 199 generates an instance of factory vehicle model data 176 for this particular vehicle 123 based on the vehicle model data 184 that is associated with the VIN for this particular vehicle 123. The vehicle model data 184 describes the design of the particular vehicle 123 associated with the VIN, whereas the factory vehicle model data 176 includes all the digital data necessary to cause the game engine 166 to generate a virtual version of the particular vehicle 123 associated with the VIN; this virtual version may be referred to herein as a virtual factory vehicle model for the particular vehicle 123. In some embodiments, the vehicle model data 184 describes the hardware and software design of the vehicle 123. An example of the vehicle model data 184 is depicted in FIGS. 1B and 1C. See, e.g., the vehicle model data 184 depicted in FIGS. 1B and 1C.

Referring to FIG. 1A, the preceding paragraph describes the digital twin system 199 generating a virtual factory vehicle model for a particular vehicle 123 that is described by an instance of factory vehicle model data 176 for the particular vehicle 123. The digital twin system 199 separately stores the instance of the factory vehicle model data 176 in the memory 127 of the digital twin server 107; although the vehicle model data 184 may be re-used repeatedly for other vehicles having the same make and model as this particular vehicle 123, this separately stored instance of factory vehicle model data 176 is reserved for this particular vehicle 123 and will be revised by the digital twin system 199 as instances of onboard data 156 and measured data 172 are received over time. In some embodiments, these revisions are based on the onboard data 156 and the measured data 172 so that the virtual version of the particular vehicle 123 (e.g., a virtual version of the vehicle 123 which is generated based on the modified vehicle model data 177 for this vehicle 123) remains consistent with the condition of the vehicle 123 as it exists in the real-world, and in this way, is the digital twin of the real-world vehicle 123.

For example, the digital twin system 199 monitors for onboard data 156 and measured data 172 that are received by the digital twin server 107 and associated with the VIN for this particular vehicle 123; the digital twin system 199 updates the factory vehicle model data 176 based on the onboard data 156 and the measured data 172 to reflect the depreciation or appreciation described by one or more of the onboard data 156 and the measured data 172, and in this way outputs the modified vehicle model data 177 for this particular vehicle 123. This modified vehicle model data 177 is operable, when executed by the processor 125 of the digital twin server 107, to cause the processor 125 to generate a digital twin of this particular vehicle 123 that accurately reflects the state of this particular vehicle 123 because the modified vehicle model data 177 is generated based on the onboard data 156 recorded by this particular vehicle 123 and the measured data 172 for this particular vehicle. In some embodiments, the digital twin system 199 continues to monitor for onboard data 156 and measured data 172 that are received by the digital twin server 107 and associated with the VIN for this particular vehicle 123; the digital twin system 199 updates the modified vehicle model data 177 based on the onboard data 156 and the measured data 172 to reflect further depreciation or appreciation described by the onboard data 156 and the measured data 172, and in this way the digital twin system 199 continuously updates a digital twin for a particular vehicle 123 (e.g., by updating the modified vehicle model data 177 to reflect the condition of the vehicle 123 as described by the onboard data 156 and the measured data 172).

The factory vehicle model data 176 includes all the digital data necessary to cause the game engine 166 to generate a virtual version of a particular vehicle 123 (i.e., a digital twin of the particular vehicle 123) in a simulation provided by the game engine 166. The digital twin generated based on the factory vehicle model data 176 represents the particular vehicle 123 as manufactured. In other words, the digital twin generated based on the factory vehicle model data 176 represents a vehicle 123 that is not depreciated or appreciated and is otherwise unaltered from its condition when manufactured. The modified vehicle model data 177 is also operable to cause the game engine 166 to generate a digital twin of the particular vehicle 123, but this digital twin represents the vehicle in an altered condition relative to its condition when manufactured.

The onboard data 156 is described above with reference to the vehicle 123, and so, that description will not be repeated here. The onboard data 156 is received by the communication unit 145 of the digital twin server 107 from the network 105. The communication unit 145 of the digital twin server 107 provides the onboard data to the digital twin system 199. The onboard data 156 includes digital data that uniquely identifies the particular vehicle 123 that recorded and transmitted the onboard data 156 (e.g., a VIN). The digital twin system 199 stores the onboard data 156 in the memory 127 of the digital twin server 107 in a way that indicates that this particular instance of onboard data 156 is associated with the particular vehicle 123 indicated by the VIN. In this way, the digital twin system 199 is able to accurately update the vehicle model for this particular vehicle 123 based on the onboard data 156. As used here, "the vehicle model for this particular vehicle 123" means the factory vehicle model data 176 for this particular vehicle 123 if no modified vehicle model data 177 exists for this particular vehicle 123, or the modified vehicle model data 177 for this particular vehicle 123 if one exists in the memory 127 of the digital twin server 107.

The measured data 172 includes digital data that describes a service event for a particular vehicle 123. In some embodiments, the measured data 172 includes the VIN for the particular vehicle 123 or some other digital data that uniquely identifies the particular vehicle 123 that received the service event. A service event is an event when the vehicle 123 is taken to a dealership, repair shop or used vehicle shop for servicing. The report system 140A, 140B, 140C is software installed in the servers 108, 109, 110 of these dealerships, repair shops and used vehicle shops. The report system reports the measured data 172 to the digital twin system 199 via the network 105 so that the measured data 172 can be included analysis and other functionality provided by the digital twin system 199. For example, the report system 140 causes the communication unit 145 of these servers 108, 109, 110 to report the measured data 172 back to the digital twin system 199 via the network 105.

The modified vehicle model data 177 includes digital data that describes a modified vehicle model for a particular vehicle 123. The modified vehicle model data 177 includes all the digital data necessary to cause the game engine 166 to generate a virtual version of the particular vehicle 123 (i.e., a digital twin of the particular vehicle 123) in a simulation provided by the game engine 166. The digital twin generated based on the modified vehicle model data 177 represents the particular vehicle 123 in a state that is different than its state as manufactured. In other words, the digital twin represents the particular vehicle 123 in a modified state that is accurate relative to the actual condition of the particular vehicle 123 in the real-world. The modified state of the vehicle 123 may include depreciation, appreciation or a combination of depreciation and appreciation (e.g., some components of the vehicle 123 are depreciated, while other components of the vehicle 123 are appreciated).

The digital twin system 199 includes code and routines that are operable to receive the modified vehicle model data 177 for a particular vehicle 123 as an input, as well as simulation data 155 that describes one or more virtual roadway environments (e.g., a road surface and other features of the road surface) as well as one or more static and dynamic objects included in the virtual roadway environments (e.g., traffic signs, traffic lights, pedestrians, pot holes, animals, other vehicles, etc.) and then perform hundreds or thousands of simulations which estimate one or more of the following: a mechanical condition of the vehicle 123; whether particular parts of the vehicle 123 will need to be replaced in the near future; how the vehicle 123 will perform in the future; a risk posed by the driver of the vehicle 123 when operating the vehicle 123; and a fair price for an insurance policy for the driver of the vehicle 123 (e.g., a liability or collision insurance policy for a particular driver to operate a particular vehicle 123). The evaluation data 178 includes digital data that describes one or more of the following: a mechanical condition of the vehicle 123; whether particular parts of the vehicle 123 will need to be replaced in the near future; how the vehicle 123 will perform in the future; a risk posed by the driver of the vehicle 123 when operating the vehicle 123; and a fair price for an insurance policy for the driver of the vehicle 123. In some embodiments, the estimates described by the evaluation data 178 are based on the simulations performed by the digital twin system 199 for the particular vehicle using the modified vehicle model data 177 for this particular vehicle 123.

The modification data 157 was described above with reference to the vehicle 123, and so, that description will not be repeated here. In some embodiments, the digital twin system 199 generates the modification data 157 by performing one or more simulations that estimate, among other things, how the driver of the vehicle behaves in different situations and the risk created by this behavior. The digital twin system 199 includes code and routines that are operable, when executed by the processor 125 of the digital twin server 107, to cause the processor 125 to estimate how to modify the operation of one or more ADAS systems of the vehicle 123 to reduce this risk created by the behavior of the driver based on the one or more simulations. In this way, the digital twin system 107 generates the modification data 157 according to some embodiments. In some embodiments, the modification data 157 includes digital data that describes how to modify the operation of the one or more ADAS systems to reduce this risk created by the behavior of the driver based on the one or more simulations and thereby reduce the cost of an insurance policy for the driver to operate the vehicle 123.

The simulation data 155 includes all the digital data necessary to create static and dynamic objects in one or more simulations provided by the game engine 166. The simulation data 155 may be operable to cause the static and dynamic objects included in the one or more simulations to have realistic behavior and realistic physical properties. The one or more simulations include the digital twin of the particular vehicle 123. The simulation data 155 may be generated by the game engine 166 based at least in part on modified vehicle model data 177 which is modified based on the onboard data 156 and the measured data 172 so that the modified vehicle model described by the modified vehicle model data 177 accurately reflects the current state of the particular vehicle 123 that is described by the onboard data 156 and the measured data 172.

In some embodiments, the evaluation data 178 is digital data describing, among other things, the performance of the digital twin while operating in the simulation provided by the game engine 166. For example, the evaluation data 178 describes how discrete virtualized vehicle components included in the digital twin performed under certain situations presented to the digital twin during the simulation. In another example, the evaluation data 178 describes how the driver of the vehicle 123 represented by the digital twin would behave in certain situations included in the simulation based on how the driver has handled other similar situations as described by the onboard data 156 (e.g., as described by one or more of the behavior metrics and the insurance metrics). The evaluation data 178 may be generated by the game engine 166 based on the operation of the digital twin during the course of one or more simulations provided by the game engine 166 based on the simulation data 155. In some embodiments, the evaluation data 178 describes the current state of each component of the vehicle 123 relative to the expected service life for each component of the vehicle 123 as indicated by the vehicle model for this particular vehicle 123. The vehicle model for this particular vehicle is described by the vehicle model data 184 (e.g., the vehicle model data 184 depicted in FIGS. 1B and 1C) for this particular vehicle 123.

The digital twin system 199 includes one or more of the following elements: a modeling application 133; and a game engine 166.

In some embodiments, the modeling application 133 includes code and routines that are operable, when executed by the processor 125 of the digital twin server 107, to generate a vehicle model. In some embodiments, the vehicle model that describes the hardware and software design of the vehicle 123 in its factory condition, which may be collectively referred to as a "vehicle design" for the vehicle 123. In some embodiments, the vehicle model is described by the vehicle model data 184 (see, e.g., the vehicle model data 184 depicted in FIGS. 1B and 1C). In other words, the modeling application generates the vehicle model data 184 based on the vehicle design for the vehicle (e.g., the vehicle 123). The modeling application 133 receives the vehicle model data 184 and generates the factory vehicle model data 176 based on the vehicle model data 184. The modeling application 133 may generate and modify the factory vehicle model data 176 based on one or more instances of onboard data 156 and measured data 172 that are received from a particular vehicle 123, and thereby generate the modified vehicle model data 177 based on the factory vehicle model data 176 and one or more of the following: one or more instances of onboard data 156; and one or more instances of measured data 172.

In some embodiments, additional instances of onboard data 156 and/or measured data 172 are received by the digital twin system 199 for this particular vehicle 123. The modeling application 133 modifies the modified vehicle model data 177 based on one or more instances of onboard data 156 and measured data 172 that are received from a particular vehicle 123, and thereby generates a second version of the modified vehicle model data 177 based on the prior version of the modified vehicle model data 177 and the additional instances of one or more of the following: one or more additional instances of onboard data 156; and one or more additional instances of measured data 172. In some embodiments, additional versions of the modified vehicle model data 177 (e.g., a third version, a fourth version, a fifth version . . . an Nth version, etc.) are generated by the digital twin system 199 as additional instances of onboard data 156 and measured data 172 are received for this particular vehicle 123.

Initially, the factory vehicle model data 176 may be based on the vehicle design of the vehicle 123 described by the vehicle model data 184 without any depreciation events or appreciation events. The vehicle model data 184 may be retrieved from the vehicle model data set 174 or inputted as one or more files updated to the digital twin system 199 by a vehicle design engineer or some other administrator of the digital twin server 107. However, over time depreciation and appreciation events occur (e.g., the vehicle 123 is driven and accrues mileage, the vehicle 123 is involved in a collision, the oil for the vehicle 123 is changed, the brake pads for the vehicle 123 are changed, other wear-and-tear events, etc.) the modeling application 133 generates the modified vehicle model data 177 based on the onboard data 156 and any measured data 172 received from the network 105. In this way, the vehicle model described by the factory vehicle model data 176 is modified by the modeling application 133 to generate the modified vehicle model data 177 which accurately reflects the current state of the vehicle 123 in the real-world as described by the onboard data 156 and the measured data 172.

In some embodiments the digital twin system 199 includes one or more modeling applications 133. Different modeling applications 133 may be specialized for generating or modifying particular types of digital models (herein "models") which are included in the vehicle design described by the factory vehicle model data 176 or the modified vehicle model data 177. For example, the digital twin system 199 may include one or more of the following modeling applications: Dymola (produced by Dassault Systemes AB, Lund of Velizy-Villacoublay, France, and used to generate a vehicle model); MapleSim (produced by Maplesoft of Waterloo, Ontario, and used to generate a vehicle model); Simulink (produced by MathWorks of Natick, Mass., and used to generate models of a the one or more ADAS systems of the vehicle); and PreScan (produced by TASS International of the Netherlands, and used to generate models of a the one or more ADAS systems of the vehicle), etc.

The modeling application 133 may also generate other models used by the game engine 166. For example, the modeling application 133 may generate a model describing a virtual roadway environment for inclusion in the simulation provided by the game engine 166. The modeling application 133 may also generate a model describing virtual and static objects which are included in the simulation provided by the game engine 166.

The game engine 166 may include code and routines that are operable, when executed by the processor of the digital twin server 107, to generate a simulation based on the one or more models generated by the one or more modeling applications 133. The game engine 166 may also include software for generating the vehicle roadway model based on inputs provided by a human administrator of the digital twin server 107 or other data uploaded to the digital twin server 107 (e.g., via the network 105 or some other data uploaded to the digital twin server 107 such as via a memory card or some other non-transitory memory). An example of the game engine 166 may include the Unity game engine (produced by Unity Technologies of San Francisco, Calif.) or some other game engine.

One or more of the game engine 166 and the modeling application 133 may generate the one or more models that describe the one or more dynamic objects and the behavior of these dynamic objects.

The game engine 166 may include software that is operable, when executed by the processor of the digital twin server 107, to generate the simulation data 155. The game engine 166 may generate the simulation data 155 based on the modified vehicle model data 177 and other digital data that describes the different models discussed above. The simulation data 155 and the game engine 166, when executed by the processor 125, may cause the processor 125 to generate one or more simulations for testing the operation of a virtual vehicle which accurately represents the operation of vehicle 123 based on its current state as described by the onboard data 156 and the measured data 172 since the modeling application 133 has modified the factory vehicle model data 176 based on the onboard data 156 and the measured data 172 to generate the modified vehicle model data 177.

In some embodiments, the game engine 166 runs one or more simulations to test and evaluate the performance of the digital twin built based on the modified vehicle model data 177 in the one or more simulations. The game engine 166 generates the one or more simulations using the simulation data 155. The simulation data 155 is determined by the game engine 166 using the latest version of the modified vehicle model data 177. In this way, the simulation data 155 enables the game engine 166 to generate the one or more simulations which test the operation of the digital twin which accurately represents the operation of real-world vehicle 123, and the behavior of the driver of the real-world vehicle 123, based on its current state as described by the onboard data 156 and the measured data 172. In other words, the digital twin, when simulated by the game engine 166, accurately simulates the performance of the vehicle 123 while experiencing the modified performance caused by the depreciation events and appreciation events described by the onboard data 156 and the measured data 172, as well as the behavior patterns demonstrated by the driver of the real-world vehicle 123. As the one or more simulations are running, the game engine 166 generates (1) the evaluation data 178 which describes the performance and behavior of the digital twin while operating in the one or more simulations relative to the design specification for the vehicle 123 and (2) the modification data 157.

The design specification for the vehicle 123 includes digital data that describes the vehicle design for the vehicle 123 and how its discrete vehicle components operate when their operation conforms to the vehicle design, as well as the expected service life for each of these vehicle components and how these vehicle components perform at different points in their service life (which can then be used to estimate the current state of each vehicle component based on analysis of the one or more simulations performed by the game engine 166). The specifications for the one or more vehicle components describes the design of these vehicle components and how they should operate when included in the vehicle design. In some embodiments, the specification for the vehicle 123 or the specifications for the one or more vehicle components describe a level of performance that the vehicle components of the vehicle 123 should provide for the vehicle 123 in order for the vehicle 123 to operate in accordance with its design.

In some embodiments, the simulations provided by the digital twin system 199 are not video games since, for example, video games are not operable to: generate digital data that modifies the operation of an ADAS system of a real-world vehicle 123 as is done when the digital twin system 199 generates the modification data 157; or generate digital data that is operable to determine the cost for an insurance policy for a human driver to operate a real-world vehicle 123 as is done with the digital twin system 199 generates the evaluation data 178.

In some embodiments, the digital twin system 199 includes code and routines that are operable, when executed by the processor 125 of the digital twin server 107, to cause the processor 125 to execute one or more of the following steps: (1) generating a simulated version of the vehicle 123 in its "new state" based on vehicle model for the vehicle 123; (2) aggregate onboard data 156 and measured data 172 that describe changes in the state of the vehicle 123; (3) updating the vehicle model of the vehicle 123, i.e., the "digital twin," based on the onboard data 156 and the measured data 172 to form the modified vehicle model data 177; (4) executing one or more simulations using the modified vehicle model data 177 and a set of simulation data 155 (the one or more simulations model a future performance of the vehicle 123 whose digital twin is described by the modified vehicle model data 177) to generate the evaluation data 178; and (5) generating modification data 157 based on the evaluation data 178. In some embodiments, the one or more simulations executed at step (4) estimate the risk posed by the driver of the vehicle and a fair price for an insurance policy for the driver of the vehicle, and these estimates are described by the evaluation data 178. In some embodiments, the one or more simulations are executed on a periodic or continual basis, or when requested to do so by an end customer such as an insurance company that operates the insurance server 111. In some embodiments, the one or more simulations that generate the modification data 157 may include simulations executed at step (5) in addition to those that generate the evaluation data 178 at step (4). In some embodiments, the modification data 157 may be generated by the same simulations at step (4) that output the evaluation data 178.

Examples of modeling applications 133 and game engines 166 used in some of the embodiments described herein are described in U.S. patent application Ser. No. 15/135,135 filed on Apr. 21, 2016 and entitled "Wind Simulation Device," the entirety of which is hereby incorporated by reference. See, for example, the "virtual simulation tool" described in U.S. patent application Ser. No. 15/135,135. Embodiments of this technology are also discussed in U.S. patent application Ser. No. 15/074,842 filed on Mar. 18, 2016 and entitled "Vehicle Simulation Device for Crowd-Sourced Vehicle Simulation Data," the entirety of which is hereby incorporated by reference. Embodiments of this technology are also discussed in U.S. patent application Ser. No. 15/085,644 filed on Mar. 30, 2016 and entitled "Dynamic Virtual Object Generation for Testing Autonomous Vehicles in Simulated Driving Scenarios," the entirety of which is hereby incorporated by reference. One or more of the digital twin system 199 and the vehicle monitor 196 described herein may be modified to include any of the elements described in U.S. patent application Ser. No. 15/135,135, U.S. patent application Ser. No. 15/085,644, and U.S. patent application Ser. No. 15/074,842.

In some embodiments, the digital twin system 199 of the digital twin server 107 may be implemented using hardware including a FPGA or an ASIC. In some other embodiments, the digital twin system 199 may be implemented using a combination of hardware and software. The digital twin system 199 may be stored in a combination of the devices (e.g., servers or other devices). The digital twin system 199 is described in more detail below with reference to FIGS. 1B, 1C and 2-6.

The dealership server 108 is a hardware server similar to the digital twin server 107. The dealership server 108 is operated by a vehicle dealership. The dealership server 108 includes a report system 140 that collects measured data 172 as measured by the technicians and personnel of the dealership when servicing the vehicle 123. For example, the report system 140 causes an electronic display (e.g., a computer monitor) to display a graphical user interface depicting an electronic form and a technician inputs information about the vehicle 123 into the electronic form, and this information is described by the measured data 172. The communication unit 145 of the dealership server 108 provides the measured data 172 recorded at the dealership to the network 105, and the communication unit 145 of the digital twin server 107 receives the measured data 172 from the network 105 and takes steps that cause the measured data 172 to be stored in the memory 127 of the digital twin server 107.

The repair shop server 109 is a hardware server similar to the digital twin server 107. The repair shop server 109 is operated by a repair shop. The repair shop server 109 includes a report system 140 that collects measured data 172 as measured by the technicians and personnel of the repair shop when servicing the vehicle 123. The communication unit 145 of the repair shop server 109 provides the measured data 172 recorded at the repair shop to the network 105, and the communication unit 145 of the digital twin server 107 receives the measured data 172 from the network 105 and takes steps that cause the measured data 172 to be stored in the memory 127 of the digital twin server 107.

The used vehicle shop server 110 is a hardware server similar to the digital twin server 107. The used vehicle shop server 110 is operated by a used vehicle shop. The used vehicle shop server 110 includes a report system 140 that collects measured data 172 as measured by the technicians and personnel of the used vehicle shop when servicing the vehicle 123. The communication unit 145 of the used vehicle shop server 110 provides the measured data 172 recorded at the used vehicle shop to the network 105, and the communication unit 145 of the digital twin server 107 receives the measured data 172 from the network 105 and takes steps that cause the measured data 172 to be stored in the memory 127 of the digital twin server 107.

A used car shop (sometimes called a used car lot) is differentiated from a dealership because a used vehicle shop is not an official dealer for a particular vehicle manufacturer, and as such, the measured data 172 it provides is less reliable and may be given less weight by the digital twin system 199 when generating the modified vehicle model data 177. Similarly, the measured data 172 provided by the dealership server 108 may also be given greater weight than the measured data 172 provided by the repair shop server 109.

In some embodiments, one or more of the onboard data 156 and the measured data 172 describes a vehicle component of the vehicle 123. For example, the vehicle 123 a set of components and one or more of the onboard data 156 and the measured data 172 describes a state or condition of one or more of these vehicle components. The vehicle 123 may include sensors that are operable to measure the information about these vehicle components which is described by the onboard data 156 or the measured data 172. Optionally, for measured data 172, a technician or some other user may use a hand-held sensor that measures the information about these vehicle components.

In some embodiments, example vehicle components include one or more of the following: an engine; a brake; a brake line; a fuel injector; a fuel line; a power steering unit; a transmission; a tire; a filter; a vehicle fluid; a brake pad; a brake rotor; a sensor; an onboard vehicle computer; a windshield; a battery; a windshield wiper; a windshield; an alternator; a spark plug; a sparkplug wire; a battery wire; a distributor cap; a vehicle body panel; a infotainment system component; a powertrain component; and a belt. For example, a vehicle component is damaged, replaced or otherwise depreciated or appreciated, and one or more of the measured data 172 and the onboard data 156 describe this event and a quantity for the depreciation or the appreciation for the vehicle component.

In some embodiments, examples of depreciation or appreciation of the vehicle 123 include one or more of the following: an engine is repaired; an engine is damaged; a brake line is cut; a brake line is patched or reinstalled; a fuel injector is clogged; a fuel injector has exceeded its lifespan and is now malfunctioning; a fuel injector is cleaned; a fuel injector is repaired or replaced; a power steering unit is worn out; a power steering unit is replaced; a power steering unit has its power steering fluid replaced or topped off; a transmission is slipping or otherwise malfunctioning; a transmission is replaced, repaired or has its transmission fluid replaced; a tire is inflated below or above its recommended air pressure; the tread of a tire is worn down below its recommended level; a tire has not been rotated within its recommended cycle for rotating tires; a tire is inflated to its recommended tire pressure; a tire is replaced; a tire is rotated; a filter is clogged; a filter is used for its recommended term or past its recommended term; a filter is replaced; a filter is cleaned; a vehicle fluid is contaminated or otherwise rendered defective; a vehicle fluid is replaced or topped off; a brake pad is worn; a brake pad is replaced; a brake rotor is scratched or damaged; a brake rotor is replaced or resurfaced; a sensor is dirty, damaged or otherwise malfunctioning or not providing sensor data; a sensor is cleaned, re-wired, replaced or its driver is updated; a sensor's fuse is replaced; an onboard vehicle computer is malfunctioning or not responding; an onboard vehicle computer is replaced, rewired or updated; a windshield is cracked, chipped or otherwise damaged; a windshield is repaired or replaced; a battery fluid is low, a battery's terminals are dirty, a battery will not hold a charge; a battery's wires or wire insulation is frayed, cut or otherwise defective; a battery's fluid (e.g., water) is replaced or topped off; a battery's terminals are cleaned; a battery's wires or replaced or repaired; a windshield wiper is used past its useful life; a windshield wiper is replaced or its cleaning blade is replaced; an alternator is shorted, used past its useful life or otherwise not outputting enough current to maintain a battery's charge; an alternator is replaced, an alternator's belt is replaced or tightened; a spark plug is malfunctioning, a spark plug is replaced or re-gapped; a sparkplug wire is shorted or damaged; a sparkplug wire is replaced; a distributor cap has a short or is otherwise malfunctioning; a distributor cap is replaced; a vehicle body panel is dented, bent, warped, scratched, has damaged or undesirable paint or is otherwise damaged or undesirable; the vehicle body panel is repaired, replaced or repainted; a infotainment system component is damaged or malfunctioning; the infotainment system component is replaced; a powertrain component is malfunctioning; a powertrain component is repaired or replaced; a belt is worn or loose; a belt is tightened or replaced; etc. These examples are intended to be illustrative and not limiting.

Examples of vehicle components being measured are described in U.S. patent application Ser. No. 15/363,368 filed on Nov. 29, 2016 and entitled "Optimization of a Vehicle to Compensate for Water Contamination of a Fluid of a Vehicle Component," the entirety of which is hereby incorporated by reference.

The insurance server 111 is a hardware server similar to the digital twin server 107. The insurance server 111 is operated by an insurance company. As depicted, the insurance server 111 includes the following elements: a communication unit 145; a processor (not pictured, but similar to the processor 125 of the digital twin server 107); and a non-transitory memory (not pictured, but similar to the memory 127 of the digital twin server 107) that stores the modified vehicle model data 177 and the evaluation data 178. In some embodiments, the insurance server 111 includes an instance of the digital twin system 199. Accordingly, the digital twin system 199 is depicted with a dashed line as an element of the insurance server 111 to indicate that the digital twin system 199 is an optional element of the insurance server 111 in some embodiments.

The following elements of the insurance server 111 are similar to those described above for either the vehicle 123 or the digital twin server 107, and so, those descriptions will not be repeated here: the communication unit 145; the modified vehicle model data 177; the evaluation data 178; and the digital twin system 199. In some embodiments, the communication unit 145 of the insurance server 111 receives the modified vehicle model data 177 from the digital twin server 107 via the network 105 and generates the evaluation data 178 based on the modified vehicle model data 177. In some embodiments, the non-transitory memory 127 of the insurance server 111 also stores the simulation data 155 which is used by the digital twin system 199 of the insurance server 111 to execute one or more simulations that generate the evaluation data 178 locally on the insurance server 111 instead by remotely on the digital twin server 107. In some embodiments, a human operator of the insurance server 111 requests the modified vehicle model data 177 from the operator of the digital twin server 107 in exchange for compensation. As a result, the insurance company that operates the insurance server 111 has access to the best possible data set that describes the real-world condition of the vehicle 123 and how this vehicle 123 is actually driven by a human driver of the vehicle 123. The operator of the insurance server 111 is therefore able to generate the evaluation data 178 which is then used to determine more accurate and fairer pricing for an insurance policy for a driver of the vehicle 123 whose condition is represented by the modified vehicle model data 177.

In some embodiments, the modified vehicle model data 177 is only provided to the operator of the insurance server 111 if the driver of the vehicle 123 provides their consent to have this digital data shared with the insurance server.

In some embodiments, the evaluation data 178 is unlike any other data found in existing solutions because, for example, the evaluation data 178 is generated based on a digital twin of the vehicle 123 and this digital twin includes the insurance metrics, behavioral metrics and depreciation/appreciation information described herein.

Referring now to FIG. 1B, depicted is a block diagram illustrating a process flow 198 for the digital twin system 199 to provide evaluation data 178 and modification data 157 according to some embodiments.

As depicted in FIG. 1B, an insurance server 111 provides a request for modified vehicle model data 177 for a particular vehicle 123 and a particular driver of this vehicle. The insurance server 111 includes a digital twin system 199 that outputs the evaluation data 178 based on the modified vehicle model data 177 that is received as an input to the digital twin system 199 of the insurance server 111. Either the digital twin system 199 of the insurance server 111 or the digital twin system 199 of the digital twin server 107 then outputs the modification data 157 based on the evaluation data 178 that is received as an input to the digital twin system 199 of the insurance server 111 or the digital twin system 199 of the digital twin server 107. Although not depicted in FIG. 1B, the modification data 157 is provided as an input to a vehicle 123. The vehicle monitor 196 of the vehicle 123 includes code and routines that are operable, when executed by the processor of the vehicle 123, to modify the operation of one or more onboard systems of the vehicle 123 based on the modifications described by the modification data 157.

In some embodiments, the digital twin system 199 executes one or more simulations for the digital twin described by the modified vehicle model data 177 using the following digital data as inputs: (1) the simulation data; and (2) the modified vehicle model data 177. The evaluation data 178 is generated based on these one or more simulations.

As depicted in FIG. 1B, the vehicle model data 184 is digital data that describes the vehicle model for a particular make and model of a particular vehicle that is being monitored by the digital twin system 199. For example, the vehicle model data 184 is digital data that describes the hardware and software design of a particular vehicle 123.

The communication unit 145 of the digital twin server 107 receives the measured data 172 and the onboard data 156 from the network 105, which is not pictured in FIG. 1B. FIG. 1B depicts a single instance of measured data 172 and onboard data 156 being received by the digital twin system 199. However, in practice multiple instances of measured data 172 and onboard data 156 may be received, and the modified vehicle model data 177 updated after new instances of measured data 172 and onboard data 156 are received so that the modified vehicle model is updated to reflect the present state of the real-world vehicle 123. In this way the modified vehicle model data 177 describes the digital twin in a modified condition as described by the onboard data 156 and the measured data 172; this version of the digital twin is continuously updated as new measured data 172 and onboard data 156 are received. The flow of measured data 172 and onboard data 156 from the vehicle monitor 196 of the vehicle 123 to the digital twin system 199 provides a feedback loop so that the modified vehicle model data 177 is repeatedly updated to reflect the latest onboard data 156 and measured data 172 that describe the condition of the real-world vehicle 123.

Referring now to FIG. 1C, depicted is a block diagram illustrating a process flow 197 for a digital twin system 199 to provide modification data 157 and evaluation data 178 according to some embodiments.

As depicted in FIG. 1C, the modification data 157 and the evaluation data 178 are each generated by the same digital twin system 199 according to some embodiments. The evaluation data 178 is provided as an input to the insurance server 111. The modification data 157 is provided as an input to a vehicle 123. The vehicle monitor 196 of the vehicle 123 includes code and routines that are operable, when executed by the processor of the vehicle 123, to modify the operation of one or more onboard systems of the vehicle 123 based on the modifications described by the modification data 157.

An example advantage of the process flow 197 depicted in FIG. 1C relative to the process flow 198 depicted in FIG. 1B is that the modified vehicle model data 177, including the onboard data 156 (as well as its insurance metrics and behavior metrics) remain confidential and shielded from knowledge by the insurance company that operates the insurance server 111. A driver may prefer this embodiment because it provides them with increased privacy since fewer parties know their behavior profile and other confidential information.

Figure 2:
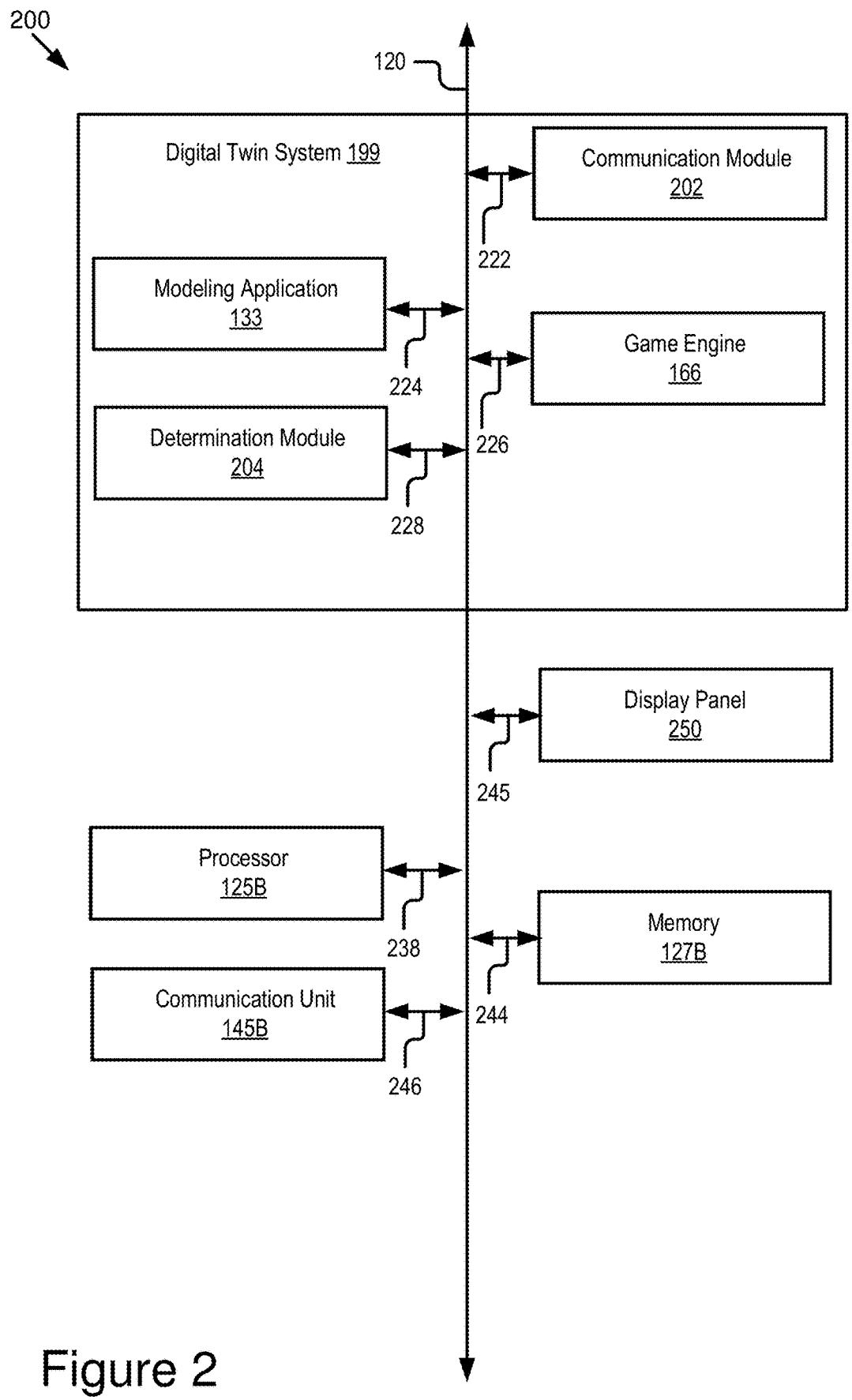
FIG. 2 is a block diagram illustrating an example computer system including the digital twin system according to some embodiments.

Referring now to FIG. 2, depicted is a block diagram illustrating an example computer system 200 including a digital twin system 199 according to some embodiments.

In some embodiments, the computer system 200 may include a special-purpose computer system that is programmed to perform one or more steps of a method 300 described below with reference to FIG. 3.

In some embodiments, the computer system 200 may be an element the digital twin server 107.

In some embodiments, the digital twin system 199 is an element of the vehicle 123. In some embodiments, the computer system 200 may be an onboard vehicle computer of the vehicle 123. In some embodiments, the computer system 200 may include an electronic control unit, head unit or some other processor-based computing device of the vehicle 123.

The computer system 200 may include one or more of the following elements according to some examples: the digital twin system 199; the processor 125; the communication unit 145; the memory 127; and a display panel 250. The components of the computer system 200 are communicatively coupled by a bus 120.

In the illustrated embodiment, the processor 125 is communicatively coupled to the bus 120 via a signal line 238. The communication unit 145 is communicatively coupled to the bus 120 via a signal line 246. The memory 127 is communicatively coupled to the bus 120 via a signal line 244. The display panel 250 is communicatively coupled to the bus 120 via a signal line 245.

The following elements of the computer system 200 were described above with reference to FIG. 1A, and so, those descriptions will not be repeated here: the processor 125; the communication unit 145; and the memory 127.

The display panel 250 is an electronic display panel that is operable to display graphical visualizations or other visual information. For example, the display panel is a monitor, a television, a touchscreen, or some other electronic device that is operable to display visual information for viewing by a human user of the computer system 200. In some embodiments, the display panel 250 displays one or more of the notifications described above with reference to FIG. 1A.

The memory 127 may store any of the data described above with reference to FIGS. 1A-1C, or any other data described herein. The memory 127 may store any data necessary for the computer system 200 to provide its functionality.

In the illustrated embodiment shown in FIG. 2, the digital twin system 199 includes: a communication module 202; the modeling application 133; the game engine 166; and a determination module 204.

The communication module 202 can be software including routines for handling communications between the digital twin system 199 and other components of the computer system 200. In some embodiments, the communication module 202 can be a set of instructions executable by the processor 125 to provide the functionality described below for handling communications between the digital twin system 199 and other components of the computer system 200 or the operating environment 100.

The communication module 202 sends and receives data, via the communication unit 145, to and from one or more elements of the operating environment 100. The communication module 202 may send or receive any of the data or messages described above with reference to FIGS. 1A-1C or below with reference to FIGS. 3-6 via the communication unit 145.

In some embodiments, the communication module 202 receives data from components of the digital twin system 199 and stores the data in the memory 127. For example, the communication module 202: (1) receives the modified vehicle model data 177 and newly received onboard data 156; and (2) transmits the modified vehicle model data 177 and the newly received onboard data 156 to the modeling application so that the modified vehicle model data 177 may be updated based on newly received onboard data 156. The communication module 202 then stores the updated version of the modified vehicle model data 177 in the memory 127. In this way, the digital twin for a vehicle is continuously updated as new information about the vehicle is received by the digital twin system 199.

In some embodiments, the communication module 202 may handle communications between components of the digital twin system 199. For example, the communication module 202 may receive modified vehicle model data 177 from the modeling application 133 and transmit the modified vehicle model data 177 to the game engine 166. The communication module 202 may receive evaluation data 178 from the game engine 166 and transmit the evaluation data 178 to the determination module 204 so that the modification data 157 may be generated based on the evaluation data 178. The communication module 202 may receive modification data 157 from the determination module 204 and transmit the modification data 157 to the communication unit 145 with instructions for the communication unit 145 to transmit the modification data 157 to the network 105. The communication module 202 may also receive evaluation data 178 from the game engine 166 and transmit the evaluation data 178 to the communication unit 145 with instructions for the communication unit 145 to transmit the evaluation data 178 to the network 105.

In some embodiments, the communication module 202 can be stored in the memory 127 of the computer system 200 and can be accessible and executable by the processor 125. The communication module 202 is adapted for cooperation and communication with the processor 125 and other components of the computer system 200 via signal line 222.

The modeling application 133 was described above with reference to FIG. 1A, and so, that description will not be repeated here.

In some embodiments, the modeling application 133 can be stored in the memory 127 of the computer system 200 and can be accessible and executable by the processor 125. The modeling application 133 is adapted for cooperation and communication with the processor 125 and other components of the computer system 200 via signal line 224.

The game engine 166 was described above with reference to FIG. 1A, and so, that description will not be repeated here.

In some embodiments, the game engine 166 can be stored in the memory 127 of the computer system 200 and can be accessible and executable by the processor 125. The game engine 166 is adapted for cooperation and communication with the processor 125 and other components of the computer system 200 via signal line 226.

The determination module 204 includes code and routines that are operable, when executed by the processor 125, to cause the processor 125 to receive the evaluation data 178 from the game engine 166 and generate the modification data 157 and based on the evaluation data 178. In some embodiments, the determination module 204 includes code and routines that are operable, when executed by the processor 125, to cause the processor 125 to execute one or more of the steps of the method 300 depicted in FIG. 3.

In some embodiments, the determination module 204 can be stored in the memory 127 of the computer system 200 and can be accessible and executable by the processor 125. The determination module 204 is adapted for cooperation and communication with the processor 125 and other components of the computer system 200 via signal line 228.

Figure 3:
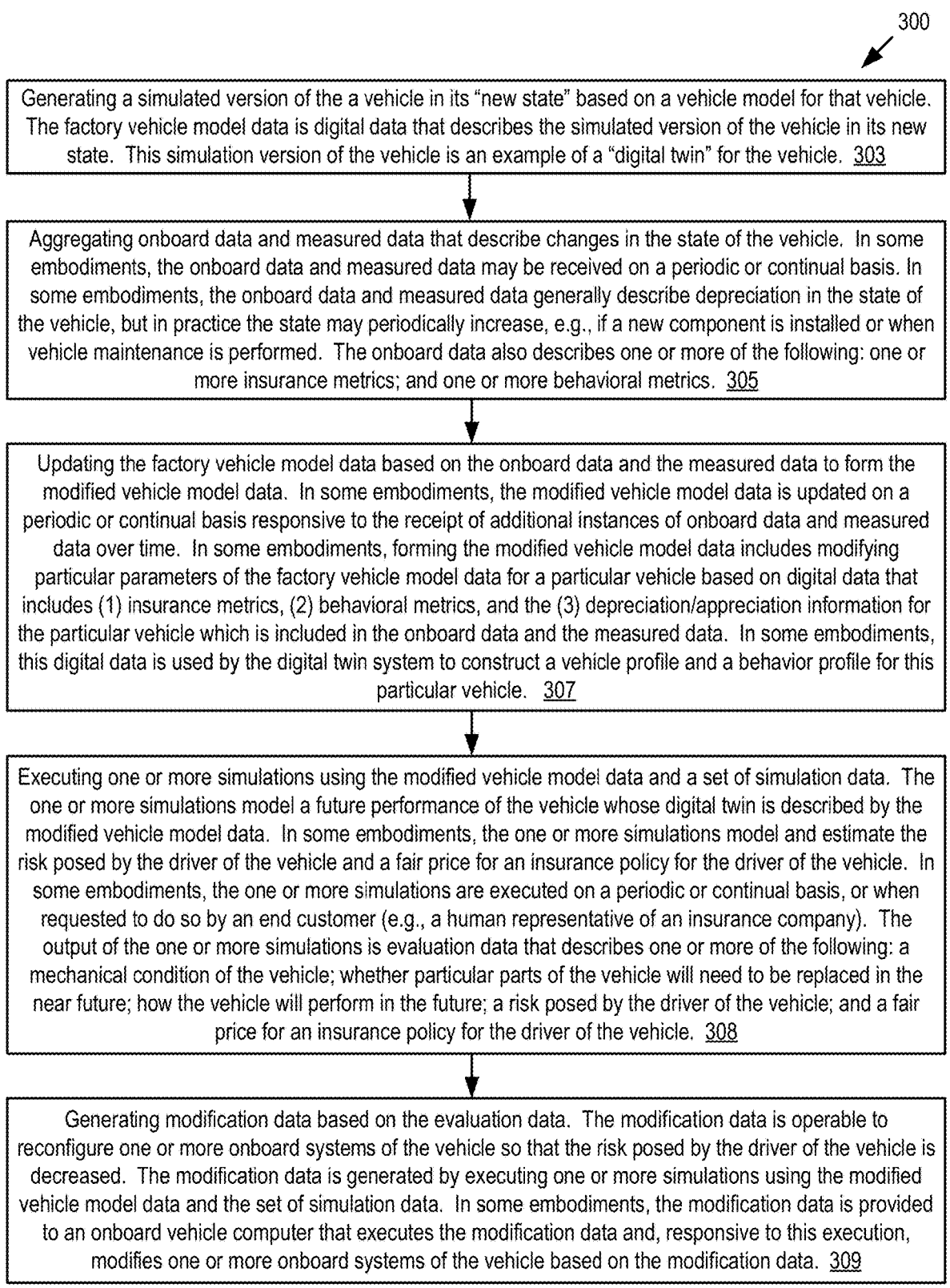
FIG. 3 includes a flowchart of an example method for providing a digital twin service for a real-world vehicle according to some embodiments.

Referring now to FIG. 3, depicted is a flowchart of an example method 300 for providing a digital twin service for a real-world vehicle according to some embodiments. The digital twin service includes one or more steps of the method 300. One or more of the steps described herein for the method 300 may be executed by one or more computer systems 200. The steps of the method 300 may be executed in any order, and not necessarily the order depicted in FIG. 3. In some embodiments, one or more of the steps of the method 300 depicted in FIG. 3 are optional and not necessary to provide the digital twin service.

At step 303, a simulated version of a vehicle in its "new state" is generated based on a vehicle model for that vehicle. The "new state" may include the vehicle as it was manufactured based on the vehicle model for this particular make and model of vehicle. The factory vehicle model data is digital data that describes the simulated version of the vehicle in its new state. This simulation version of the vehicle is an example of a digital twin for the vehicle.

At step 305, onboard data and measured data that describe changes in the state the vehicle are aggregated. In some embodiments, the onboard data and measured data may be received on a periodic or continual basis. In some embodiments, the onboard data and measured data generally describe depreciation in the state of the vehicle, but in practice the state may periodically increase, e.g., if a new component is installed or when vehicle maintenance is performed. In some embodiments, the onboard data also describes one or more of the following: one or more insurance metrics; and one or more behavioral metrics.

At step 307, the factory vehicle model data is updated based on the onboard data and the measured data to form the modified vehicle model data. In some embodiments, the modified vehicle model data is updated on a periodic or continual basis responsive to the receipt of additional instances of onboard data and measured data over time.

In some embodiments, forming the modified vehicle model data includes modifying particular parameters of the factory vehicle model data for a particular vehicle based on digital data that includes (1) insurance metrics, (2) behavioral metrics, and the (3) depreciation/appreciation information for the particular vehicle which is included in the onboard data and the measured data. In some embodiments, this digital data is used by the digital twin system to construct a vehicle profile and a behavior profile for this particular vehicle.

At step 308, one or more simulations are executed using the modified vehicle model data and a set of simulation data. The one or more simulations model a future performance of the vehicle whose digital twin is described by the modified vehicle model data. In some embodiments, the one or more simulations model and estimate the risk posed by the driver of the vehicle and a fair price for an insurance policy for the driver of the vehicle. In some embodiments, the one or more simulations are executed on a periodic or continual basis, or when requested to do so by an end customer (e.g., human representative of an insurance company). The output of the one or more simulations is evaluation data that describes one or more of the following: a mechanical condition of the vehicle; whether particular parts of the vehicle will need to be replaced in the near future; how the vehicle will perform in the future; a risk posed by the driver of the vehicle; and a fair price for an insurance policy for the driver of the vehicle.

At step 309, modification data is generated. The modification data is operable to reconfigure one or more onboard systems of the vehicle so that the risk posed by the driver of the vehicle is decreased when operating the vehicle. The modification data is generated by executing one or more simulations using the modified vehicle model data and the set of simulation data. In some embodiments, the modification data is provided to an onboard vehicle computer executes the modification data and, responsive to this execution, modifies one or more onboard systems of the vehicle based on the modification data. In this way, the modification data beneficially modifies the operation of the one or more onboard systems so that the risk posed by the driver of the vehicle is decreased when operating the vehicle.

Example Problem

The method 300 described above is an example of a vehicle insurance pricing analysis according to some embodiments. A problem with modern vehicles is the lack of quality data sets that can be used for vehicle insurance pricing analysis for these vehicles. As a result, insurance companies provide higher pricing for insurance as a means of reducing their financial risk. Customers of vehicle manufacturers would prefer to pay less for insurance. The digital twin system described herein solves this problem by providing modified vehicle model data which can be used for vehicle insurance pricing analysis for real-world vehicles. The modified vehicle model data can also be used by vehicle manufacturers to design future vehicles whose vehicle profiles are likely to result in lower insurance premiums, which is another way that the embodiments of the digital twin system described herein can result in lower insurance premiums and more vehicles being sold. The modified vehicle model data can also be used to generate modification data which is yet another way of modifying the operation of a vehicle so that the insurance premiums for this vehicle are lowered.

Example Solution

In some embodiments, the digital twin system solves these problems and others by executing one or more of the following steps: establishing a simulated version of a real-world vehicle in its "new state" based on a simulation model for that vehicle using a vehicle manufacturer's design data for that vehicles make and model [this simulated version of the real-world vehicle is the initial version of the digital twin for the real-world vehicle]; continuously aggregating onboard data and measured data that describe changes in the state of the real-world vehicle [generally this data will describe depreciation in the state of the real-world vehicle, but in practice the state may periodically increase, e.g., if a new component is installed or when vehicle maintenance is performed]; continuously updating the digital twin for the real-world vehicle based on the onboard data and the measured data so that both (1) the condition of the vehicle as it exists in the real-world is described by the digital twin [i.e., a "vehicle model" of the real-world vehicle] and (2) the behavior pattern of the driver of the real-world vehicle is also described by the digital twin [i.e., a "behavior model" of the driver]; providing the digital twin an insurance company in exchange for a fee so that their insurance pricing analysis is easier and more accurate performing analysis of the digital twin to determine design changes for the vehicle model so that the insurance rates for this model are cheaper in the future; and determining the modification data to modify the operation of a vehicle so that the vehicle behaves in a manner that is consistent with receiving a lower insurance premium.

In some embodiments, the design data is included in the vehicle model data 184. For example, the vehicle model data 184 includes digital data that describes the design models, CAD data, simulation/test results for each model of vehicle produced by a particular vehicle manufacturer. The digital twin system has access to the vehicle model data for each make and model of vehicle produced by this particular vehicle manufacturer. Based on the vehicle model data, the digital twin system determines the state of real-world vehicles when they are new (i.e., their "new state"). The new state of the real-world vehicle is represented in a simulation as a digital twin of the vehicle.

In some embodiments, a real-world vehicle whose digital twin is generated by the digital twin system includes an onboard vehicle compute system (e.g., an ECU) that stores a vehicle monitor. The vehicle monitor includes code and routines that are operable, when executed by the onboard vehicle compute system, to cause the onboard vehicle computer system to control the operation of the onboard systems and onboard sensors of the vehicle to monitor and record for the following types of digital data: (1) the insurance metrics; (2) the behavioral metrics; and (3) the depreciation/appreciation information. The vehicle monitor gathers this digital data and stores it as onboard data in a non-transitory memory of the onboard vehicle computer system or some other memory of the vehicle.

In some embodiments, the determination of the onboard data is done statically or dynamically. In some embodiments, the determination of the onboard data is done by the vehicle monitor, a cloud server, or an edge server. Embodiments of these optional implementations are now described.

In some embodiments, the insurance metrics, the behavioral metrics, and the depreciation/appreciation information are determined by a cloud server such as the digital twin server depicted in FIG. 1A, and not by the vehicle monitor which is local on the vehicle itself. For example, the vehicle monitor collects raw sensor data from the onboard sensors and transmits this sensor data to the digital twin server. The digital twin system which operates on the digital twin server then determines the onboard data (i.e., the insurance metrics, behavioral metrics, and the depreciation/appreciation information) based on the sensor data. The digital twin system then provides its functionality based on this onboard data.

In another embodiment, the sensor data is transmitted to an edge server that determines the onboard data based on the sensor data. The edge server then transmits the onboard data to the digital twin server and the digital twin system provides its functionality based on this onboard data.

In some embodiments, each real-world vehicle includes a communication unit that wirelessly transmits the onboard data and the measured data to a server that includes a digital twin system. The digital twin system also receives communications from dealerships, service stations and mechanics that include measured data. The measured data describes maintenance events for the real-world vehicle. As described above, the measured data includes depreciation/appreciation information for the vehicle.

In some embodiments, a digital twin generated by the digital twin system monitors the life of each vehicle based on (1) onboard data which is collected from the onboard sensors of each vehicle and (2) measured data which is collected from sources that repair each vehicle such as dealerships, repair shops and used car shops.

In some embodiments, the state of each vehicle is constantly updated by the digital twin system based on the onboard data and the measured data, thereby enabling the digital twin system to track the mechanical condition of each vehicle. The output of constantly updating the state of the real-world vehicle is referred to as a digital twin.

In some embodiments, the digital twin is a digitized version of the real-world vehicle which replicates the condition of the vehicle as a whole and individual components of the vehicle as indicated by the onboard data and the measured data. This digital twin, and its indication of the mechanical condition of a real-world vehicle, may be referred to herein as a "vehicle profile." The vehicle profile is a dynamic vehicle profile because it is constantly updated based on the onboard updated based on the onboard data and the measured data as described in the preceding paragraph.

In some embodiments, the digital twin system also builds a "behavior profile" for the driver based on their insurance metrics and behavior metrics. The behavior profile describes the behavior of the driver, and their driving patters, when these behaviors and driving patterns are relevant to the pricing of their vehicle insurance policy.

In some embodiments, the vehicle profile and the behavior profile are used by the digital twin system to model how a real-world vehicle will perform and the driver of the real-world vehicle will behave in the future based on the current state of the real-world vehicle as indicated by the vehicle profile for that real-world vehicle and the driving and behavior patterns of the driver as described by the behavior profile.

In some embodiments, both the vehicle profile and the behavior profile are incorporated in the digital twin. The digital twin is described by the modified vehicle model data.

Figure 4:
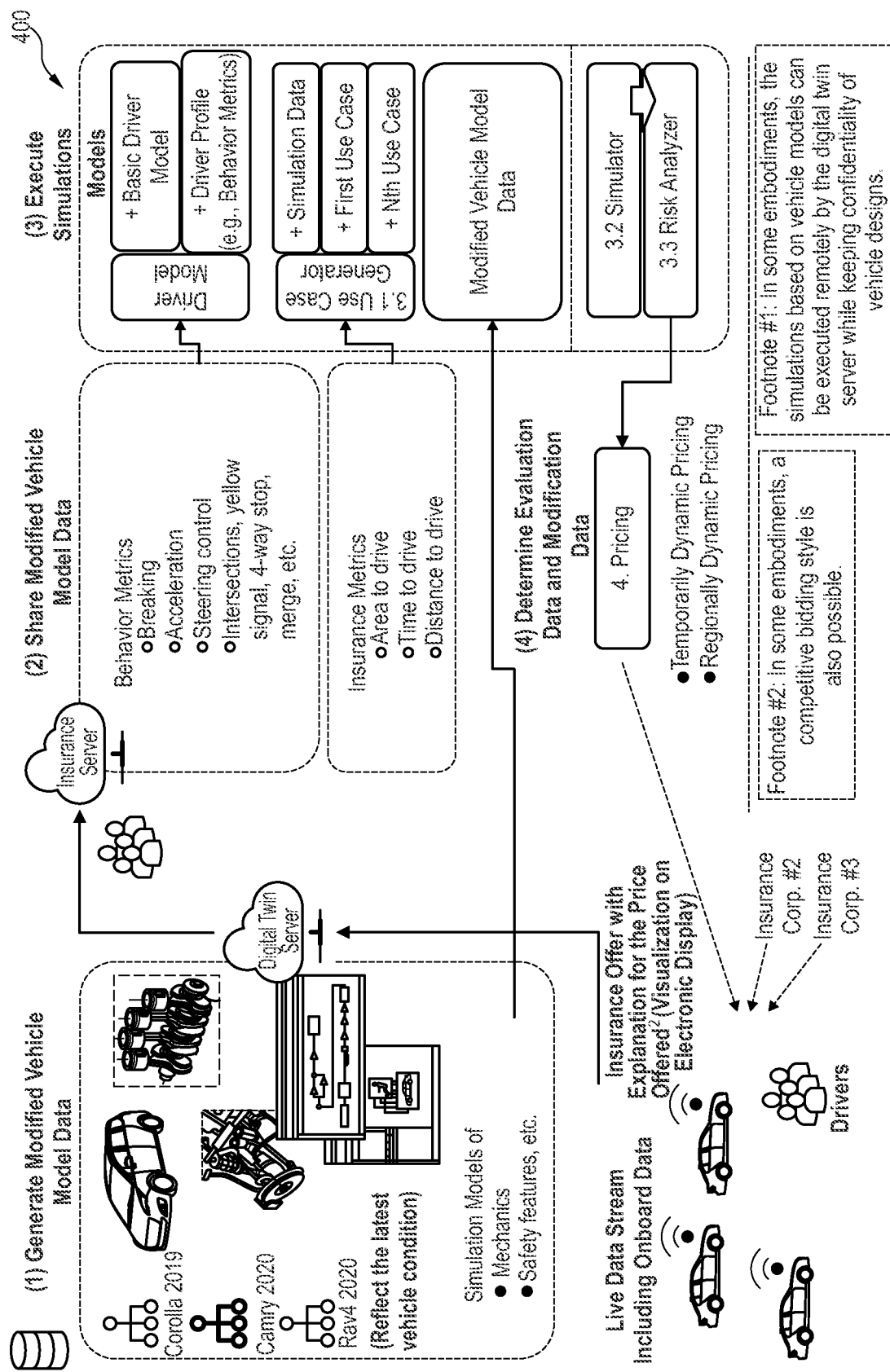
FIG. 4 is a block diagram illustrating an overview of the digital twin system according to some embodiments.

Referring to FIG. 4, depicted is a block diagram illustrating an overview 400 of the digital twin system according to some embodiments.

In some embodiments, the driver model includes a basic driver model of a virtual version of a driver and a driver profile that is a dynamic driver profile that describes the behavior of this driver; this behavior is defined by the behavior metrics so that a behavior of the virtual version of the driver is consistent with the behavior of the driver of the real-world vehicle 123 in the real-world. In this way, the virtual version of the driver behaves in the one or more simulations in a manner that is consistent with the behavior of the driver in the real-world. In some embodiments, the driver profile is built based on the behavior metrics. In some embodiments, the driver profile is an element of the modified vehicle model data.

Figure 5:
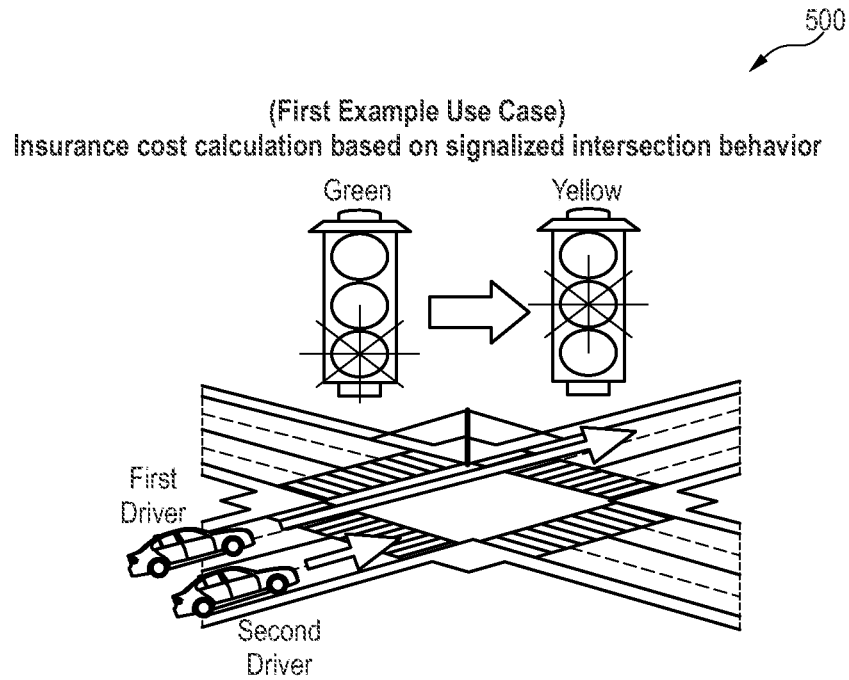
FIG. 5 is a block diagram illustrating an example first use case for the digital twin system according to some embodiments.
Figure 6:
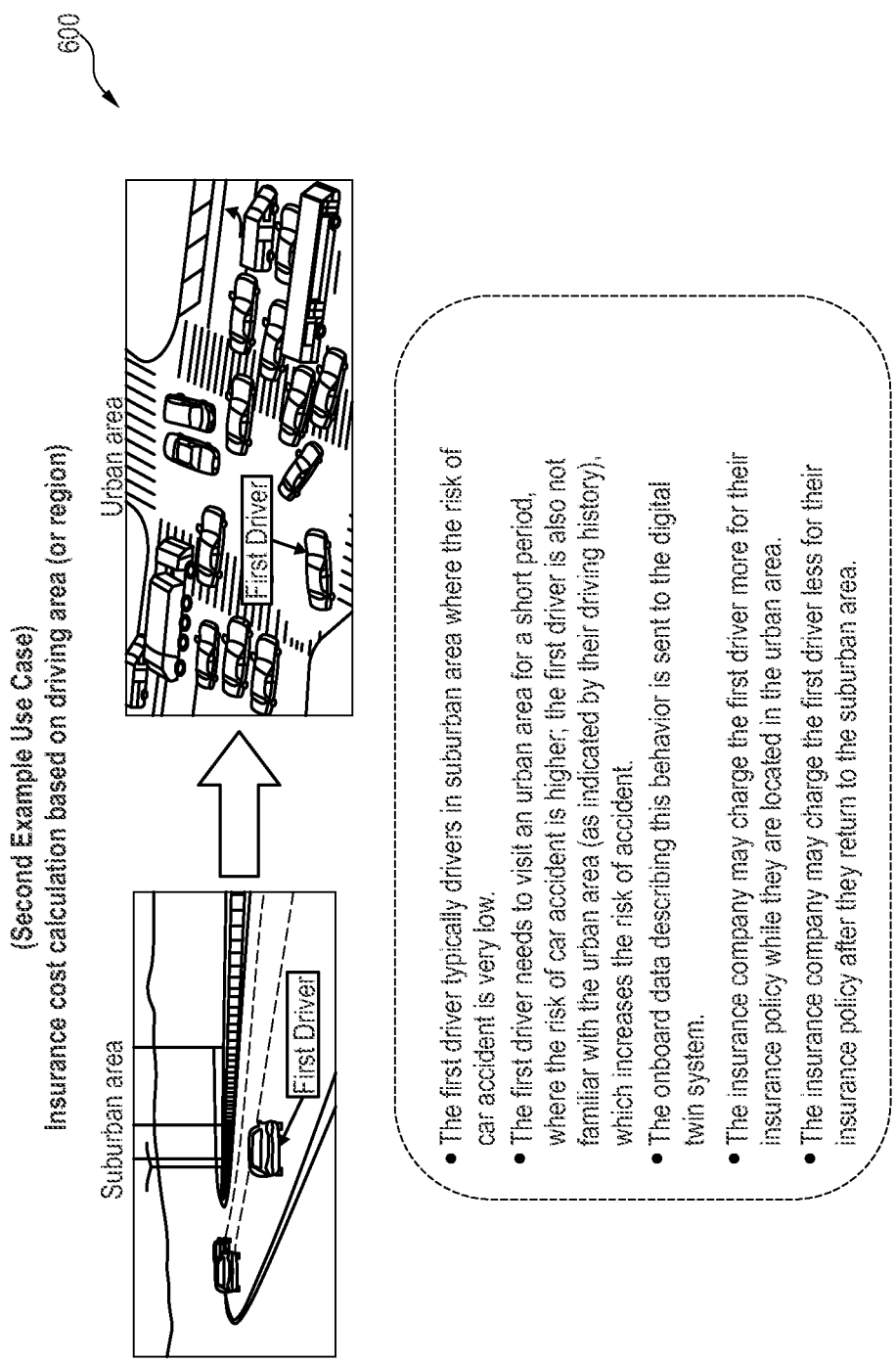
FIG. 6 is a block diagram illustrating an example second use case for the digital twin system according to some embodiments.

In some embodiments, the digital twin system includes a use case generator. The use case generator includes code and routines that are operable, when executed by a processor, to generate a plurality of use cases based on one or more of the behavior metrics and the insurance metrics. Examples of the use cases are depicted in FIGS. 5 and 6. These examples are not intended to be limiting.

Example embodiments of a use case generator (e.g., a roadway visualization system) are described in U.S. patent application Ser. No. 15/265,235 entitled "Scalable Curve Visualization for Conformance Testing in Vehicle Simulation" and filed on Sep. 14, 2016, the entirety of which is hereby incorporated by reference. Other example embodiments of a use case generator (e.g., an automated dynamic object generation system) are described in U.S. patent application Ser. No. 15/085,664 entitled "Dynamic Virtual Object Generation for Testing Autonomous Vehicle in Simulated Driving Scenarios" and filed on Mar. 30, 2016, the entirety of which is hereby incorporated by reference. Yet other example embodiments of a use case generator (e.g., a realistic roadway virtualization system) are described in U.S. patent application Ser. No. 15/013,936 entitled "Realistic Roadway Virtualization System" and filed on Feb. 2, 2016, the entirety of which is hereby incorporated by reference.

In some embodiments, the digital twin system includes a risk analyzer. The risk analyzer includes code and routines that are operable, when executed by a processor, to determine a risk created with a particular driver operates a real-world vehicle in the real-world based on the one or more simulations described herein. In some embodiments, a risk describes a probably of an undesirable result (e.g., a collision) when the real-world vehicle is operated in the real-world as indicated by the one or more simulations which are generated based in part on the modified vehicle model data and the driver profile.

Referring to FIG. 5, depicted is a block diagram illustrating an example first use case 500 for the digital twin system according to some embodiments.

Referring to FIG. 6, depicted is a block diagram illustrating an example second use case 600 for the digital twin system according to some embodiments.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method comprising:
generating a digital twin of a vehicle;
receiving digital data recorded by a sensor and describing a condition of the vehicle as it exists in a real-world and a behavior of a driver while the vehicle is operated in the real-world;
updating the digital twin of the vehicle based on the digital data so that the digital twin is consistent with the condition and the behavior;
generating, with the digital twin, a behavior profile that describes the behavior of the driver and driving patterns of the driver;
executing one or more simulations based on the digital twin and the behavior profile wherein the simulations (1) simulate a future performance of the vehicle consistent with the condition and the behavior profile and (2) estimate a fair price of an insurance policy for the vehicle based on a predicted risk associated with the future performance of the vehicle observed in the simulations; and
modifying, with an onboard system of the vehicle, an operation of the vehicle to overriding to override an action of the driver and mitigate the predicted risk posed by the vehicle and lower the fair price of the insurance policy.

2. The method of claim 1, wherein executing the one or more simulations is further based on the digital twin for a new state of the vehicle based on a make and model of the vehicle and further comprising:
aggregating onboard data and measured data that describe changes in the vehicle due to wear and tear;
updating the one or more simulations based on the behavior profile; and
generating modification data based on the one or more simulations, wherein modifying the risk is based on the modification data.

3. The method of claim 1, further comprising predicting, with the digital twin, how the driver is expected to behave at a future time period.

4. The method of claim 1, wherein the one or more simulations are executed in response to a request from an insurance company.

5. The method of claim 1, further comprising generating evaluation data based on the one or more simulations, wherein the evaluation data describes the risk created by behavior of the vehicle as operated in the real-world.

6. The method of claim 5, further comprising generating modification data that is operable to reduce the risk, wherein modifying the operation of the vehicle is based on the modification data so that the vehicle behaves in a manner to reduce the risk and thereby receive a lower insurance premium.

7. The method of claim 1, wherein the driving patterns include information about one or more of when the driver uses a brake, when the driver accelerates, or how the driver behaves at intersections.

8. The method of claim 1, wherein the operation includes engaging brakes of the vehicle in response to the vehicle approaching an illumined light or a flashing yellow light.

9. The method of claim 1, wherein the vehicle is autonomous and the operation is performed by an advanced driving assistance system.

10. The method of claim 2, wherein modifying the operation of the vehicle to mitigate the risk includes providing a notification to the driver of the vehicle that the driver is engaging in the behavior that is risky.

11. The method of claim 1, wherein multiple instances of the digital data are received over time as part of a feedback loop and the digital twin is recursively updated based on the digital data received in the feedback loop.

12. A system comprising:
a non-transitory memory storing digital data recorded by a sensor and describing a condition of a vehicle as it exists in a real-world a behavior of a driver while the vehicle is operated in the real-world; and
a processor that is communicatively coupled to the non-transitory memory, wherein the non-transitory memory stores computer code which, when executed by the processor, causes the processor to:
generate a digital twin of the vehicle;
update the digital twin of the vehicle based on the digital data so that the digital twin is consistent with the condition and the behavior;
generate, with the digital twin, a behavior profile that describes the behavior of the driver and driving patterns of the driver;
execute one or more simulations based on the digital twin and the behavior profile wherein the simulations (1) simulate a future performance of the vehicle consistent with the condition and the behavior profile and (2) estimate a fair price of an insurance policy for the vehicle based on a predicted risk associated with the future performance of the vehicle observed in the simulations; and
modify an operation of the vehicle to override an action of the driver and mitigate the predicted risk posed by the vehicle and lower the fair price of the insurance policy.

13. The system of claim 12, wherein the digital data describes a state of one or more vehicle components of the vehicle.

14. The system of claim 12, wherein executing the one or more simulations is further based on the digital twin for a new state of the vehicle based on a make and model of the vehicle and wherein the computer code, when executed by the processor, further causes the processor to:
aggregate onboard data and measured data that describe changes in the vehicle due to wear and tear,
update the one or more simulations based on the behavior profile, and
generate modification data based on the one or more simulations, wherein decreasing the risk is based on the modification data.

15. The system of claim 12, wherein executing the one or more simulations is further based on the digital twin for a new state of the vehicle based on a make and model of the vehicle and wherein the computer code, when executed by the processor, further causes the processor to generate evaluation data based on the one or more simulations wherein the evaluation data describes the fair price of the insurance policy for the vehicle.

16. The system of claim 15, wherein the evaluation data further describes the risk created by behavior of the vehicle as operated in the real-world.

17. A computer program product comprising a non-transitory memory storing computer-executable code that, when executed by a processor, causes the processor to:
generate a digital twin of a vehicle;
receive digital data recorded by a sensor and describing a condition of the vehicle as it exists in a real-world and a behavior of a driver while the vehicle is operated in the real-world;
update the digital twin of the vehicle based on the digital data so that the digital twin is consistent with the condition and the behavior;
generate, with the digital twin, a behavior profile that describes the behavior of the driver and driving patterns of the driver;
execute one or more simulations based on the digital twin and the behavior profile wherein the simulations (1) simulate a future performance of the vehicle consistent with the condition and the behavior profile and (2) estimate a fair price of an insurance policy for the vehicle based on a predicted risk associated with the future performance of the vehicle observed in the simulations; and
modify an operation of the vehicle to override an action of the driver and mitigate the predicted risk posed by the vehicle and lower the fair price of the insurance policy.

18. The computer program product of claim 17, wherein executing the one or more simulations is further based on the digital twin for a new state of the vehicle based on a make and model of the vehicle and wherein the computer-executable code, when executed by the processor, further causes the processor to:
aggregate onboard data and measured data that describe changes in the vehicle due to wear and tear,
update the one or more simulations based on the behavior profile, and generate modification data based on the one or more simulations, wherein decreasing the risk is based on the modification data.

19. The computer program product of claim 17, wherein the one or more simulations are executed in response to a request from an insurance company.

20. The computer program product of claim 19, wherein the computer-executable code, when executed by the processor, further causes the processor to generate evaluation data based on the one or more simulations, wherein the evaluation data describes the risk created by behavior of the vehicle as operated in the real-world.

\* \* \* \* \*